United States Patent
Pramod

(10) Patent No.: US 11,870,314 B2
(45) Date of Patent: Jan. 9, 2024

(54) CURRENT REGULATORS FOR DUAL WOUND SYNCHRONOUS MOTOR DRIVES

(71) Applicant: Steering Solutions IP Holding Corporation, Saginaw, MI (US)

(72) Inventor: Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 183 days.

(21) Appl. No.: 17/563,908

(22) Filed: Dec. 28, 2021

(65) Prior Publication Data

US 2023/0208230 A1    Jun. 29, 2023

(51) Int. Cl.
    *H02P 21/00*     (2016.01)
    *H02K 3/28*     (2006.01)
    *H02P 25/22*     (2006.01)

(52) U.S. Cl.
    CPC .......... *H02K 3/28* (2013.01); *H02P 21/0003* (2013.01); *H02P 25/22* (2013.01); *H02K 2201/15* (2013.01)

(58) Field of Classification Search
CPC .. H02K 2201/15; H02K 3/28; H02P 21/0003; H02P 21/22; H02P 25/22; Y02P 20/52
See application file for complete search history.

(56) References Cited

U.S. PATENT DOCUMENTS

| 11,736,048 B1* | 8/2023 | Pramod | H02P 21/22 |
| | | | 318/696 |
| 2018/0302013 A1* | 10/2018 | Nakano | H02P 21/06 |
| 2023/0208230 A1* | 6/2023 | Pramod | H02P 21/0003 |
| | | | 310/184 |

* cited by examiner

*Primary Examiner* — Naishadh N Desai
(74) *Attorney, Agent, or Firm* — Dickinson Wright PLLC

(57) ABSTRACT

A method of controlling a dual wound synchronous machine (DWSM) includes: determining virtual current commands based on a current command associated with each of two winding sets of the DWSM; determining virtual half-motor currents by applying a mathematical transformation on measured output currents; determining half-motor difference currents based on differences between the corresponding virtual current command and the virtual half-motor current; calculating forward path voltage commands based on the corresponding difference currents and using first and second gain factors; determining feedback voltage commands by applying third and fourth gain factors to the virtual half-motor currents; determining virtual final voltage commands based on the corresponding forward path and feedback voltage commands; determining final voltage commands by applying a second mathematical transformation to the virtual final voltage commands; commanding, based on the final voltage commands, inverters to apply corresponding voltages to the two winding sets and thereby generating the output currents.

20 Claims, 16 Drawing Sheets

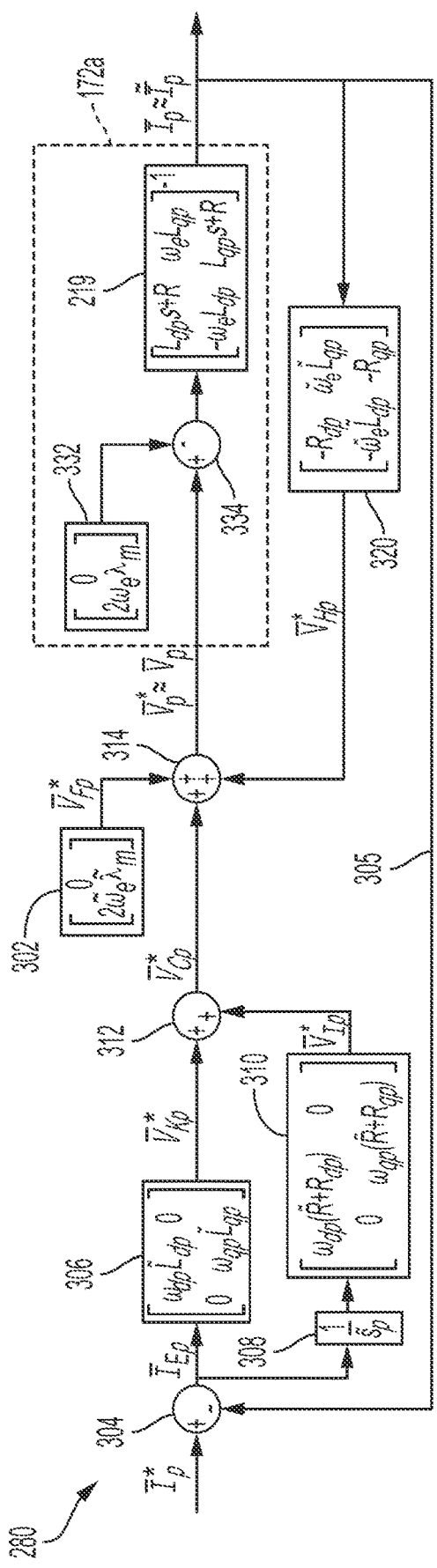
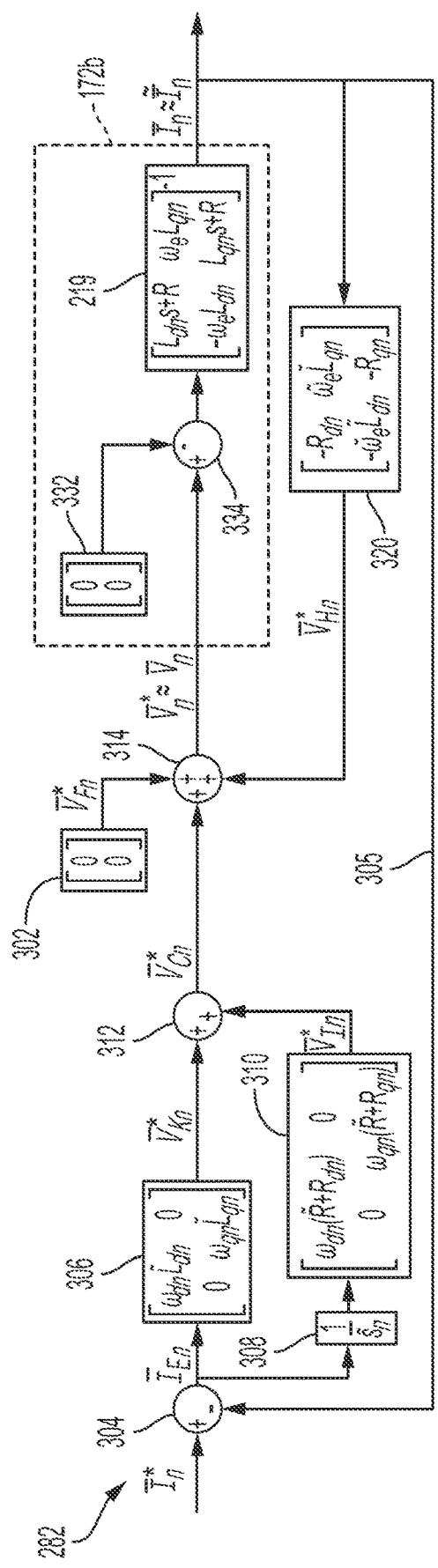
FIG. 10A
FIG. 10B

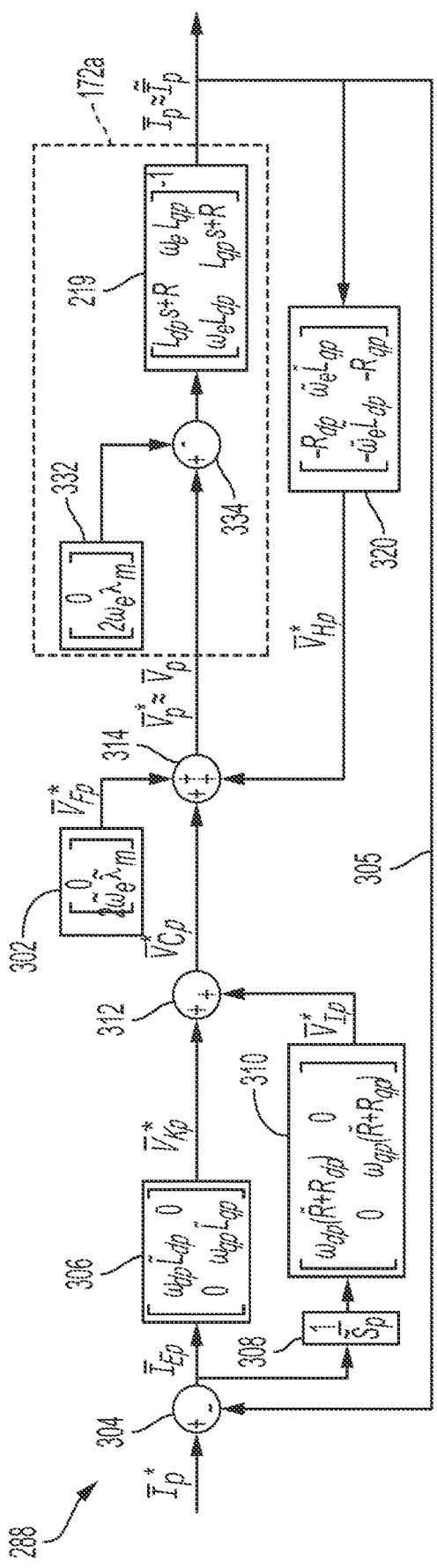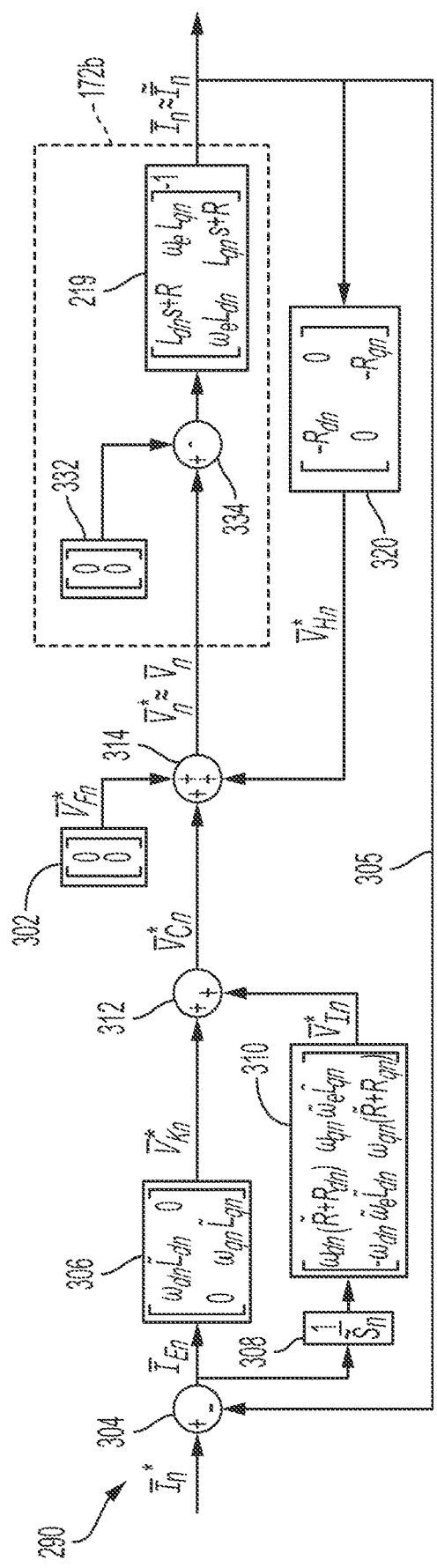
FIG. 12A
FIG. 12B

CURRENT REGULATORS FOR DUAL WOUND SYNCHRONOUS MOTOR DRIVES

BACKGROUND OF THE INVENTION

Dual wound synchronous machines, also called dual winding synchronous machines, are electric machines with two electrically independent sets of stator windings. Such dual wound synchronous machines may be used as motors, generators, or as motor/generators. Each set of stator windings may function independently as a corresponding half-motor and may be powered by a corresponding inverter. Such dual wound motors may be used in a variety of applications and can provide redundancy for safety-critical applications to allow continued operation in the event of a loss of one of the sets of stator windings and/or one of the inverters.

Dual wound synchronous machines, including dual wound permanent magnet synchronous machines (DW-PMSMs), inherently have electromagnetic (inductive) coupling between the two sets of stator windings (i.e., coupling between electrical circuits due to induction caused by magnetic fields generated as a result of the currents flowing through each of the two sets of stator windings). This induction results in a dependence of the currents, and thus torque, produced by the two winding sets of the dual wound machine. The extent or significance of this coupling depends on the specific design of the electric machine and particularly on specific features of the design including, but not limited to, stator slots, rotor poles, placement of magnets and winding configuration.

Conventional applications utilizing DW-PMSMs do not typically consider the inductive coupling between the two half-motors as significant and the resulting hardware topologies of the electric motor drive system as well as the control algorithms employed therein produce sub-optimal performance.

Torque control of DW-PMSMs is typically performed indirectly via current control, which may be implemented as a closed-loop feedback current control system employing current regulators acting on current measurements, or as a feedforward current control system utilizing an inverse mathematical model of the machine. The effect of the inductive coupling on the overall current, and thus torque, control performance of the motor control system depends significantly on the choice of current control technique and the specific structure of the controller. The present disclosure describes current regulator structures that may be used in feedback current control of DW-PMSMs that consider the electromagnetic coupling between the winding sets to achieve optimal current and torque control performance.

SUMMARY OF THE INVENTION

In one embodiment of the invention, a system for controlling a dual wound synchronous machine (DWSM) having a first winding set and a second winding set is provided. The system comprises a processor and a memory including instructions. When executed by the processor, the instructions cause the processor to: determine a positive virtual half-motor current command and a negative virtual half-motor current command based on a first motor current command associated with the first winding set and based on a second motor current command associated with the second winding set; determine a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM; determine a positive half-motor difference current based on a difference between the positive virtual half-motor current command and the positive virtual half-motor current; calculate a positive virtual half-motor forward path voltage command based on the positive half-motor difference current and using a first set of gain factors; determine a negative half-motor difference current based on a difference between the negative virtual half-motor current command and the negative virtual half-motor current; calculate a negative virtual half-motor forward path voltage command based on the negative half-motor difference current and using a second set of gain factors; determine a positive virtual half-motor feedback path voltage command by applying a third set of gain factors to the positive virtual half-motor current; determine a negative virtual half-motor feedback path voltage command by applying a fourth set of gain factors to the negative virtual half-motor current; determine a positive virtual half-motor final voltage command based on the positive virtual half-motor forward path voltage command and based on the positive virtual half-motor feedback path voltage command; determine a negative virtual half-motor final voltage command based on the negative virtual half-motor forward path voltage command and based on the negative virtual half-motor feedback path voltage command; determine a first final voltage command and a second final voltage command by applying a second mathematical transformation to the positive virtual half-motor final voltage command and the negative virtual half-motor final voltage command; command, based on the first final voltage command, a first inverter to apply a first output voltage to the first winding set and thereby causing a first output current to be generated in the first winding set; and command, based on the second final voltage command, a second inverter to apply a second output voltage to the second winding set and thereby causing a second output current to be generated in the second winding set. The first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

In another embodiment of the invention, a method of controlling a dual wound synchronous machine (DWSM) having a first winding set and a second winding set is provided. The method comprises: determining a positive virtual half-motor current command and a negative virtual half-motor current command based on a first motor current command associated with the first winding set and based on a second motor current command associated with the second winding set; determining a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM; determining a positive half-motor difference current based on a difference between the positive virtual half-motor current command and the positive virtual half-motor current;

calculating a positive virtual half-motor forward path voltage command based on the positive half-motor difference current and using a first set of gain factors; determining a negative half-motor difference current based on a difference between the negative virtual half-motor current command and the negative virtual half-motor current; calculating a negative virtual half-motor forward path voltage command based on the negative half-motor difference current and using a second set of gain factors; determining a positive virtual half-motor feedback path voltage command by applying a third set of gain factors to the positive virtual half-motor current; determining a negative virtual half-motor feedback path voltage command by applying a fourth set of gain factors to the negative virtual half-motor current; determining a positive virtual half-motor final voltage command based on the positive virtual half-motor forward path voltage command and based on the positive virtual half-motor feedback path voltage command; determining a negative virtual half-motor final voltage command based on the negative virtual half-motor forward path voltage command and based on the negative virtual half-motor feedback path voltage command; determining a first final voltage command and a second final voltage command by applying a second mathematical transformation to the positive virtual half-motor final voltage command and the negative virtual half-motor final voltage command; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. The first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 10A-10B are block diagrams illustrating a current control module controlling both the positive and negative virtual half-motors of a dual wound motor using the state feedback decoupling control configuration, according to the principles of the present disclosure.

FIG. 12A-12B are block diagrams illustrating a control module controlling the positive and negative virtual half-motors of a dual wound motor using the plant inversion and state feedback decoupling control configurations respectively, according to the principles of the present disclosure.

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
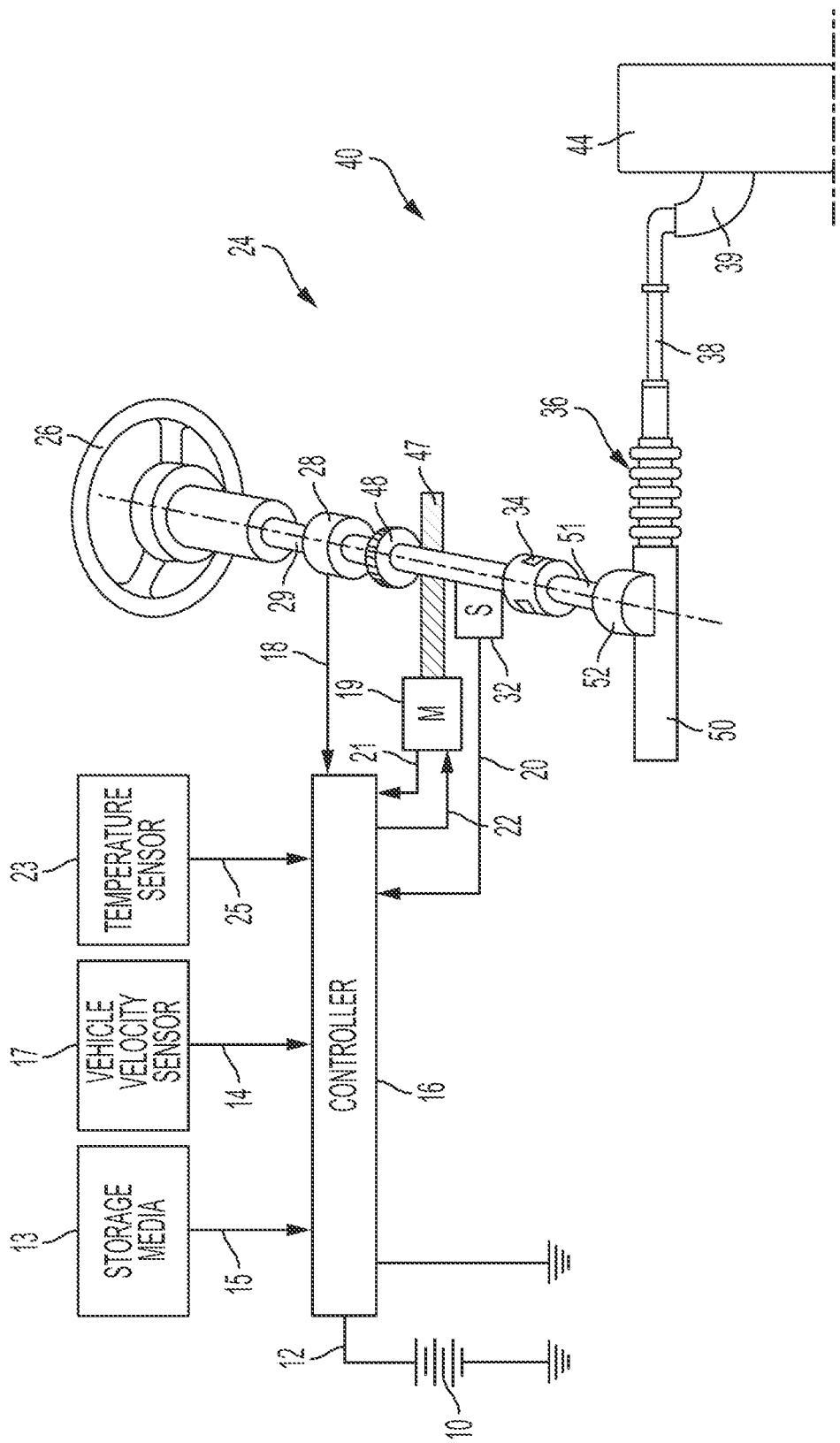
FIG. 1 is a schematic diagram of an electric power steering system according to the principles of the present disclosure.

FIG. 1 is a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a handwheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the steering motion control system generally designated by reference numeral 24 and includes the controller 16 and an electric machine, which could be a permanent magnet synchronous motor, and is hereinafter denoted as motor 19. The controller 16 is powered by the vehicle power supply 10 through supply conductors 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a velocity signal 21. A motor velocity denoted Wm may be measured, calculated or a combination thereof. For example, the motor velocity Wm may be calculated as the change of the motor position as measured by a position sensor 32 over a prescribed time interval. For example, motor speed Wm may be determined as the derivative of the motor position Om with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the steering motion control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28, which transmit the torque signals 18 indicative of an applied torque. Such a torque sensor 28 and the torque signals 18 therefrom, as may be responsive to a compliant torsion bar, spring, or similar apparatus (not shown) configured to provide a response indicative of the torque applied.

In one or more examples, a temperature sensor 23 is located at the motor 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and torque signals 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

As used herein, variables with a tilde (—) above the variable symbol represent an approximation, which may be determined by a mathematical calculation, a lookup table, etc. Variables with a bar above the variable symbol represent a vector quantity. Variables with a superscript star (*) represent commands or desired set point values.

Figure 2A:
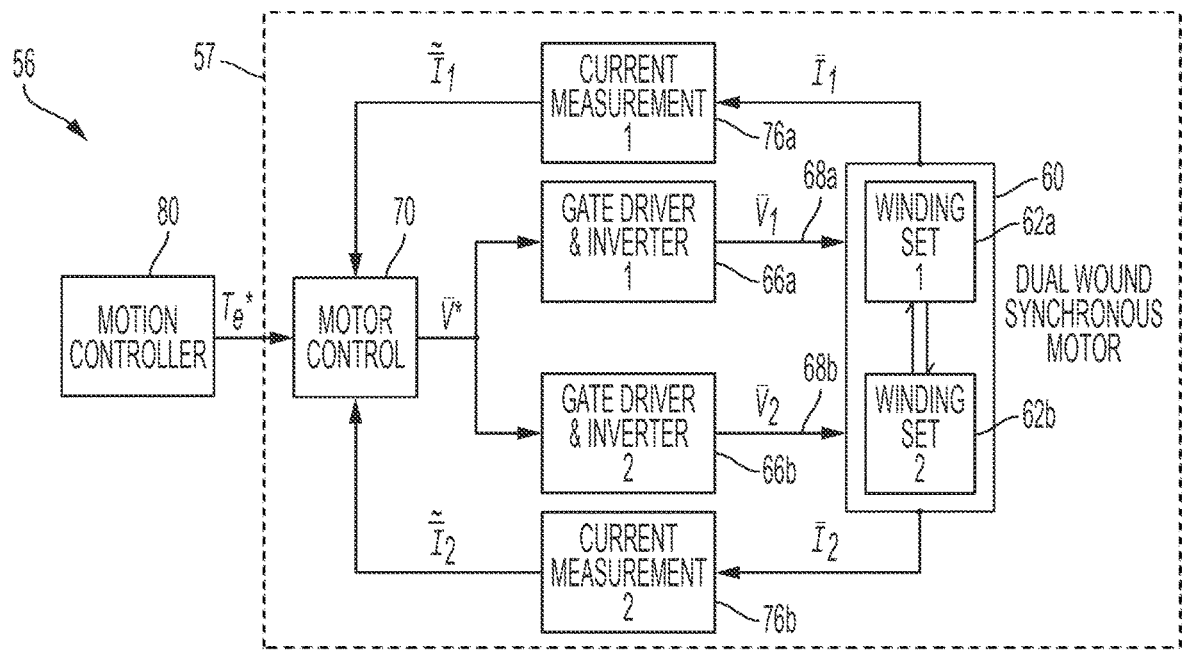
FIGS. 2A-2B are schematic diagrams of dual wound motor drive systems according to the principles of the present disclosure.

FIG. 2A illustrates a first motion control system 56, which includes a first electric motor drive system 57 having a dual wound permanent magnet synchronous motor (DW-PMSM), also called a dual wound motor 60, power converters 66a and 66b (each including a gate driver and a corresponding inverter), and a motor controller 70 (also referred to as a controller). The dual wound motor 60 may be used in any number of applications, such as for the motor 19 in the steering motion control system 24 shown in FIG. 1. The power converters 66a and 66b may include several switching devices, such as field effect transistors (FETs) for switching high current loads and gate driver circuitry for operating the switching devices. The motor controller 70 receives a motor torque command $T_e^*$ from a motion controller 80, such as, for example, a power steering controller.

The motor controller 70 may generate the voltage command $\bar{V}^*$ based on the motor torque command $T_e^*$ from the motion controller 80, and using any current control technique. For example, the motor controller 70 may include a current command generator (not shown) to generate a current command using one or more optimizations and/or to cause the first motion control system 56 to satisfy one or more operating constraints, such as constraints on voltage and/or current produced by or supplied to the first electric motor drive system 57. The current command may then be used with a suitable feedback current control technique to generate the voltage command $\bar{V}^*$. The feedback current control technique may include a technique provided in the present disclosure, although other feedback current control techniques may be used.

The dual wound motor 60 includes a first winding set 62a and a second winding set 62b that is electrically independent of the first winding set 62a. The dual wound motor 60 is capable of generating electromagnetic torque by energizing either or both winding sets 62a, 62b. The two winding sets 62a and 62b may each include three phases and thus, each of the two winding sets 62a, 62b may include three phase windings. Alternatively, each of the winding sets 62a, 62b may include any number of winding phases, such as five or seven phases. In some embodiments, the dual wound motor 60 is a poly-phase permanent magnet synchronous machine (PMSM). However, the dual wound motor 60 may be any type of synchronous machine, such as a poly-phase wound-field synchronous machine. Additionally, the dual wound motor 60 may have a salient pole configuration or a non-salient pole configuration, depending on the placement of the permanent magnets or field winding on the rotor. Each of the winding sets 62a, 62b may function individually, and the dual wound motor 60 can be operated by energizing either or both of the winding sets 62a, 62b.

The power converters 66a and 66b are configured to supply alternating current (AC) voltages to the winding sets 62a and 62b, respectively. The winding sets 62a, 62b are connected to their respective power converters 66a, 66b through the phase leads 68a and 68b. This configuration may provide for redundancy, allowing the dual wound motor 60 to continue to function even with a total loss or failure of one of the winding sets 62a, 62b, one of the motor leads 68a, 68b, and/or one of the power converters 66a, 66b. The power converters 66a, 66b may be implemented with electrical isolation for additional redundancy.

The motor controller 70 generates a voltage command $\bar{V}^*$ based on the motor torque command $T_e^*$ and based on first and second phase currents $\bar{I}_1$, $\bar{I}_2$ of the dual wound motor 60. The voltage command $\bar{V}^*$ may include d-axis and q-axis constituent parts, $V_d^*$, $V_q^*$, respectively. Each of the power converters 66a, 66b applies an output voltage $\bar{V}_1$, $\bar{V}_2$ to the corresponding one of the winding sets 62a, 62b based on the voltage command $\bar{V}^*$.

A first current sensor 76a measures the first phase currents $\bar{I}_1$ generated by the first winding set 62a. The first current sensor 76a supplies a first measured current signal $\tilde{\bar{I}}_1$ to the motor controller 70. The first measured current signal $\tilde{\bar{I}}_1$ may include d-axis and q-axis constituent parts, $\tilde{I}_{d1}$, $\tilde{I}_{q1}$, respectively. A second current sensor 76b measures the second phase currents $\bar{I}_2$ generated by the second winding set 62b. The second current sensor 76b supplies a second measured current signal $\tilde{\bar{I}}_2$ to the motor controller 70. The second measured current signal $\tilde{\bar{I}}_2$ may include d-axis and q-axis constituent parts, $\tilde{I}_{d2}$, $\tilde{I}_{q2}$, respectively.

The main limitation of the topology in FIG. 2A is that there is only one voltage command $\bar{V}^*$ output of the motor controller 70, and thus identical voltage commands must be utilized by power converters 66a, 66b to produce almost identical voltage outputs $\bar{V}_1$, $\bar{V}_2$ for applying to the two winding sets 62a, 62b. This leaves no control flexibility to obtain "optimal" control performance taking into account the inductive coupling between the two winding sets 62a, 62b. Even though the measurements of both the first and second phase currents $\bar{I}_1$, $\bar{I}_2$ are available within one microcontroller, since the output to each of the power converters 66a, 66b is "tied" (i.e. identical), the independent phase current measurements cannot be exploited for enhancing the control performance.

Figure 2B:
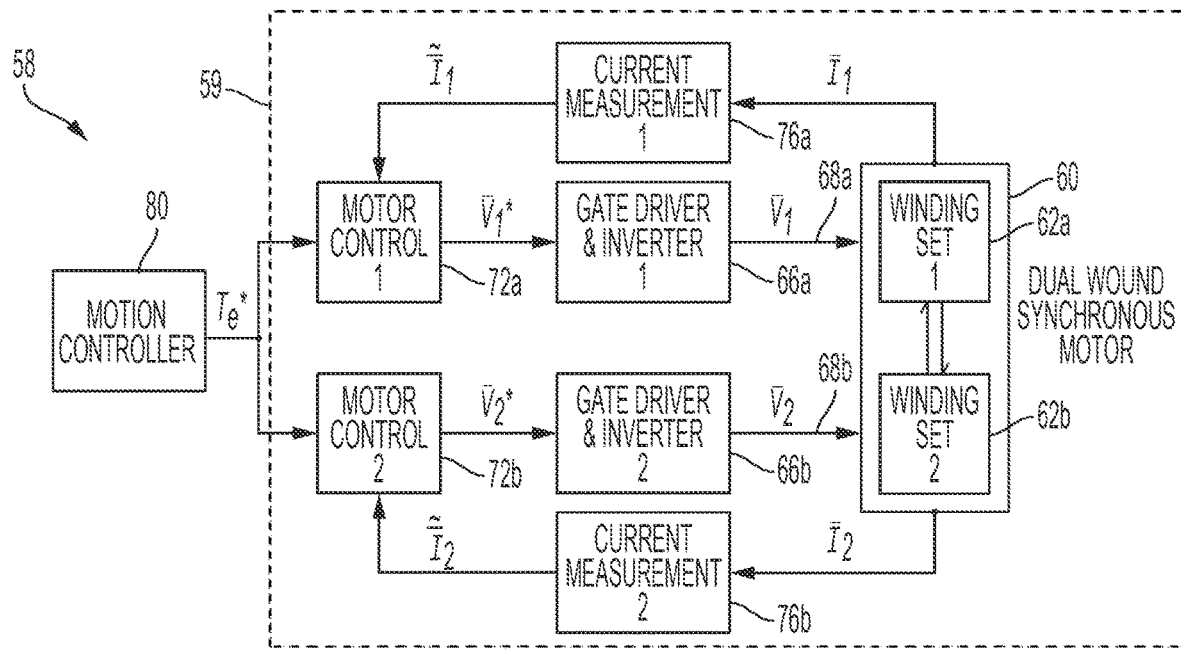

FIG. 2B illustrates a second motion control system 58, which includes a second electric motor drive system 59. The second electric motor drive system 59 is similar or identical to the first electric motor drive system 57, except it includes independent first and second motor controllers 72a, 72b instead of the single motor controller 70 of the first electric motor drive system 57. The first and second motor controllers 72a, 72b may each be implemented using a corresponding microcontroller. In some embodiments, the motion controller 80 may be implemented by a single microcontroller or using similar or identical blocks within two or more separate microcontrollers, and with appropriate scaling to ensure correct torque commands for the respective motor controllers 72a, 72b.

The first current sensor 76a supplies the first measured current signal $\tilde{\bar{I}}_1$ to the first motor controller 72a, and the second current sensor 76b supplies the second measured current signal $\tilde{\bar{I}}_2$ to the second motor controller 72b.

The first motor controller 72a generates a first voltage command $\bar{V}_1^*$ based on the motor torque command $T_e^*$ and based on the first phase current $\bar{I}_1$ of the first winding set 62a. The first voltage command $\bar{V}_1^*$ may include d-axis and q-axis constituent parts, $V_{d1}^*$, $V_{q1}^*$, respectively. The second motor controller 72b generates a second voltage command $\bar{V}_2^*$ based on the motor torque command $T_e^*$ and based on the second phase current $\bar{I}_2$ of the second winding set 62b. The second voltage command $\bar{V}_2^*$ may include d-axis and q-axis constituent parts, $V_{d2}^*$, $V_{q2}^*$, respectively. Each of the first and second voltage commands $\bar{V}_1^*$, $\bar{V}_2^*$ are supplied to the corresponding one of the power converters 66a, 66a, thereby allowing independent voltage control of the two winding sets 62a, 62b.

One potential limitation of the topology shown FIG. 2B is that measurements of the phase currents $\bar{I}_1$, $\bar{I}_2$ from each of the winding sets 62a, 62b may not be available to the separate microcontrollers implementing the two motor controllers 72a, 72b. Thus, each of the motor controllers 72a, 72b may lack information regarding the other one of the two winding sets 62a, 62b, preventing implementation of a control scheme that accounts for inductive coupling between the two winding sets 62a, 62b.

Figure 3A:
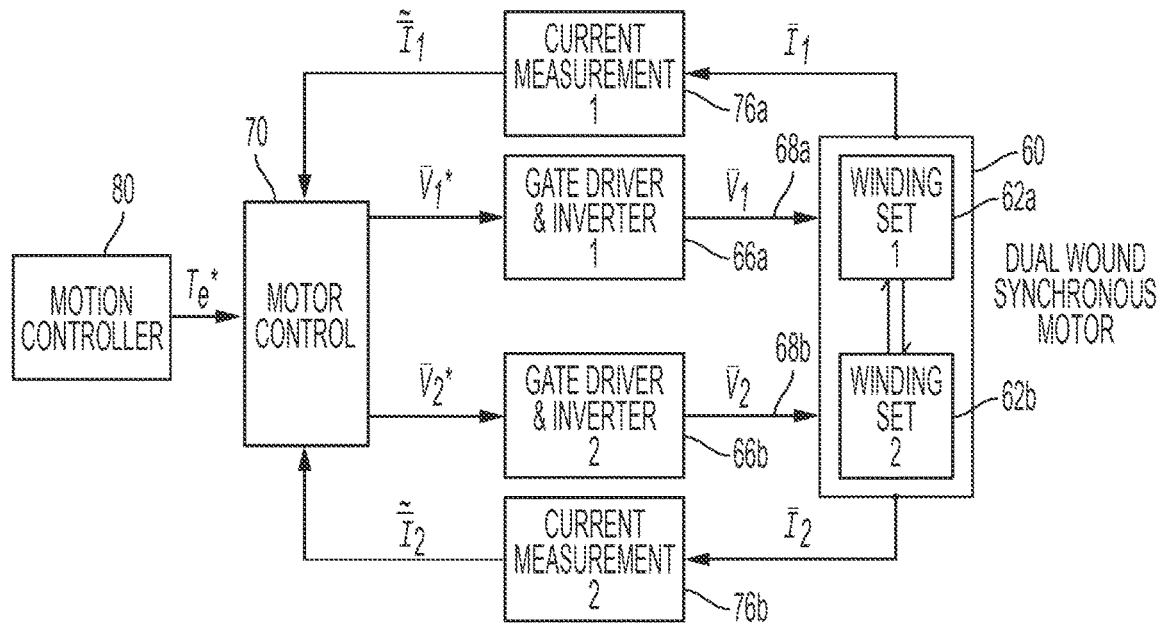
FIGS. 3A-3C are a schematic diagrams of dual wound motor drive systems according to the principles of the present disclosure.

FIG. 3A shows a schematic diagram of a dual wound motor control system that is similar or identical to the first motion control system 56 of FIG. 2A, except the motor controller 70 generates and supplies first and second voltage commands $\bar{V}_{1*}$, $\bar{V}_2^*$ to the corresponding power converters 66a, 66a. Thus, the dual wound motor control system may provide independent voltage control of the two winding sets 62a, 62b. The motor controller 70 may generate the first voltage command $\bar{V}_1^*$ to be applied to the first winding set 62a via the first power converter 66a and based on the motor torque command $T_e^*$ and both phase currents $\bar{I}_1$ and $\bar{I}_2$. The motor controller 70 may, similarly, generate the second voltage command $\bar{V}_2^*$ to be applied to the second winding set 62b via the second power converter 66b and based on the motor torque command $T_e^*$ and both the phase currents $\bar{I}_1$ and $\bar{I}_2$.

Figure 3B:
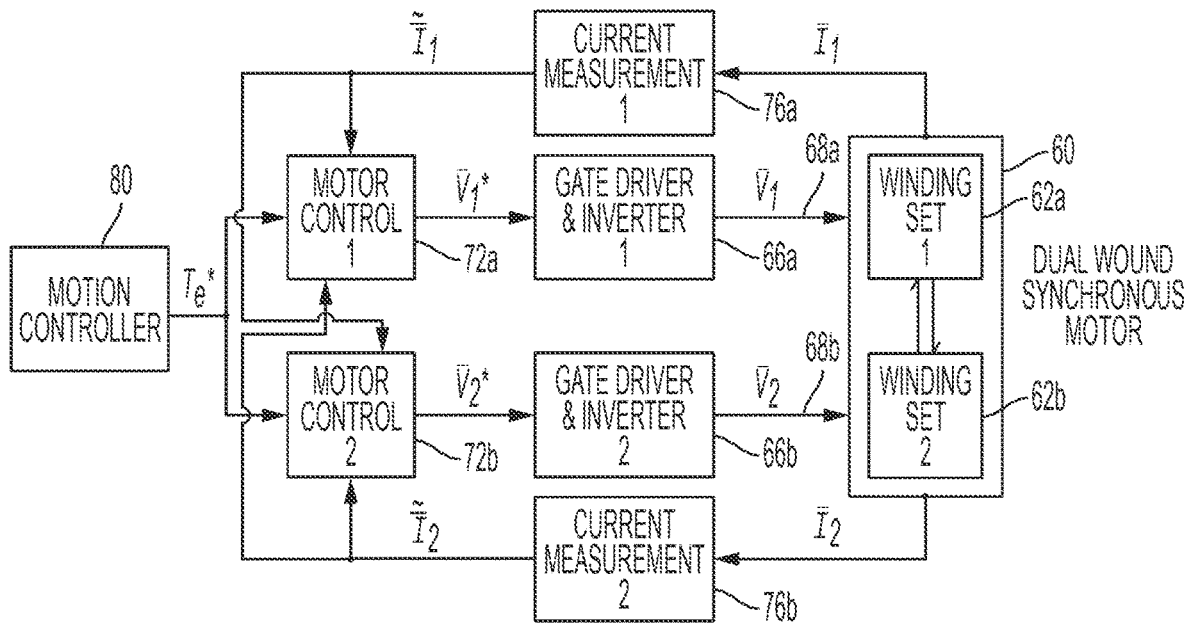

FIG. 3B shows a schematic diagram of a dual wound motor control system that is similar or identical to the second motion control system 58 of FIG. 2B, except the first current signal $\bar{I}_1$ and the second current signal $\bar{I}_2$ are each supplied from the corresponding current sensors 76a, 76b to each of the first and second motor controllers 72a, 72b. More specifically, the dual wound motor drive shown in FIG. 3B includes each of the first and second current sensors 76a, 76b directly connected to both of the first and second motor controllers 72a, 72b for supplying the corresponding one of the current signals $\bar{I}_1$, $\bar{I}_2$ thereto.

Figure 3C:
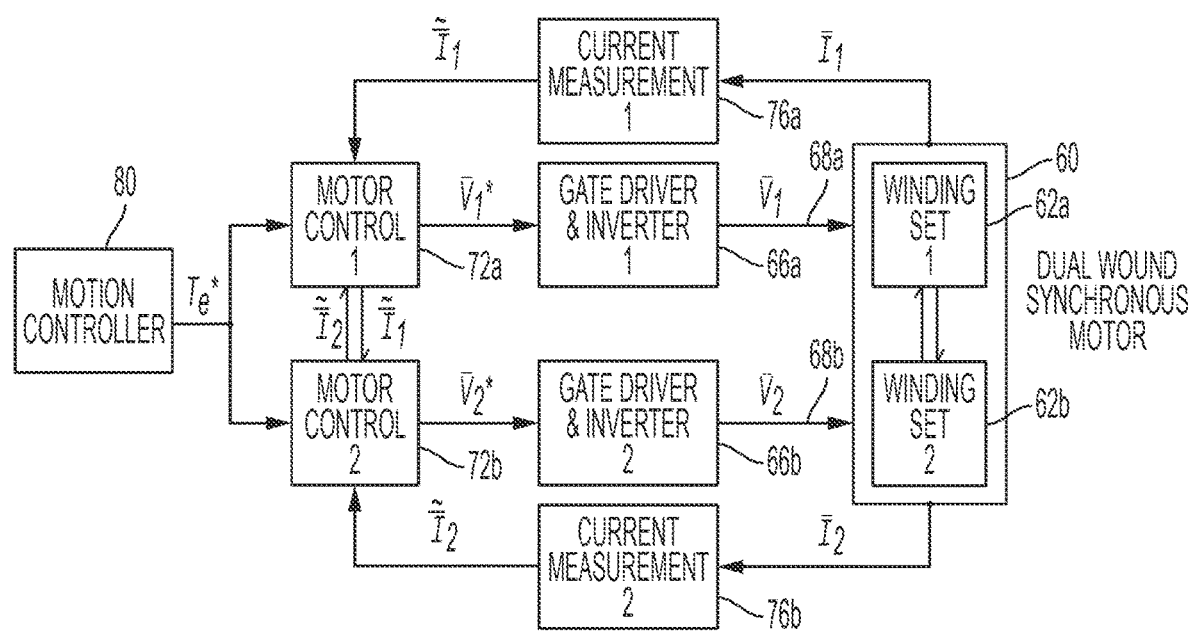

FIG. 3C shows a schematic diagram of a dual wound motor control system that is similar or identical to the second motion control system 58 of FIG. 2B, except the first current signal $\bar{I}_1$ and the second current signal $\bar{I}_2$ are each supplied from the corresponding current sensor 76a, 76b to each of the first and second motor controllers 72a, 72b. The dual wound motor drive shown in FIG. 3C includes the first and second motor controllers 72a, 72b being in communication with one another for sharing the respective current signals $\bar{I}_1$, $\bar{I}_2$. The first current signal $\bar{I}_1$ is provided by the first current sensor 76a to the first motor controller 72a, which in turn sends the first current signal $\bar{I}_1$ to the second motor controller 72b. The second current signal $\bar{I}_2$ is provided by the second current sensor 76b to the second motor controller 72b, which in turn sends the second current signal $\bar{I}_2$ to the first motor controller 72a. The current signals $\bar{I}_1$, $\bar{I}_2$ may be communicated between the first and second motor controllers 72a, 72b through the use of a so-called "inter-micro communication" shown as two half arrows passing between the two motor controllers 72a, 72b. This is typically a digital communication setup so that the two motor controllers 72a, 72b can exchange information at desired rates.

Control algorithm development for DW-PMSMs previously has assumed negligible inductive coupling exists between the two half-motors. While the idea that such coupling may exist has been conceived, sufficient analytical or mathematical models capturing the effect have not been derived or presented. As a result, conventional control designs do not consider this coupling, and there is always inherently some current induction between the two sides of the DW motor. This document presents a general mathematical model of DW-PMSMs in the synchronous or dq reference frame which is valid for non-salient as well as salient pole configurations. A simplified model that is applicable to non-salient pole machines is also provided.

The general mathematical model of DW-PMSMs is shown in equation (1), below.

$$\begin{bmatrix} V_{d1} \\ V_{q1} \\ V_{d2} \\ V_{q2} \end{bmatrix} = \begin{bmatrix} R+L_d s & \omega_e L_q & M_d s & \omega_e M_q \\ -\omega_e L_d & R+L_q s & -\omega_e M_d & M_q s \\ M_d s & \omega_e M_q & R+L_d s & \omega_e L_q \\ -\omega_e M_d & M_q s & -\omega_e L_d & R+L_q s \end{bmatrix} \begin{bmatrix} I_{d1} \\ I_{q1} \\ I_{d2} \\ I_{q2} \end{bmatrix} + \omega_e \begin{bmatrix} 0 \\ \lambda_m \\ 0 \\ \lambda_m \end{bmatrix} \quad (1)$$

In this model, the two sides, or half-motors are referred to using subscripts 1 and 2, $V_d$ and $V_q$ are the d-axis and q-axis motor voltages, respectively. $I_d$ and $I_q$ are the d-axis and q-axis motor currents, respectively. R is the phase resistance, $L_d$ and $L_q$ are the d-axis and q-axis inductances, respectively of each half-motor. $M_d$ and $M_q$ are the inductance terms that represent coupling between the two half-motors, $\omega_e$ is the electrical motor velocity, and $\lambda_m$ is the permanent magnet (PM) flux linkage. Note that the electrical motor velocity is also referred to as the synchronous frequency of the machine and is related to the mechanical motor velocity $\omega_m$ as follows:

$$\omega_e = p\omega_m \quad (2)$$

where p is the number of magnetic pole pairs.

The electromagnetic torque $T_e$ is determined by equation (3), below:

$$T_e = p((\lambda_m(I_{q1}+I_{q2}))+(L_q-L_d)(I_{d1}I_{q1}+I_{d2}I_{q2})+(M_q-M_d)(I_{d1}I_{q2}+I_{d2}I_{q1})) \quad (3)$$

The parameters in equations (1)-(3) may vary significantly during normal operation of the dual wound motor 60. The resistance R varies with temperature of the windings of the dual wound motor 60 and may be different for the two winding sets. The inductances $L_d$, $L_q$, $M_d$, $M_q$ may each simultaneously vary independently and nonlinearly due to magnetic saturation (represented through dependency on currents $I_{d1}$, $I_{q1}$, $I_{d2}$, $I_{q2}$). The PM flux linkage $\lambda_m$ may vary due to magnetic saturation and temperature.

A simplified mathematical model for non-salient pole machines assuming equal d-axis and q-axis inductances is shown in equation (4), below.

$$\begin{bmatrix} V_{d1} \\ V_{q1} \\ V_{d2} \\ V_{q2} \end{bmatrix} = \begin{bmatrix} R+Ls & \omega_e L & Ms & \omega_e M \\ -\omega_e L & R+Ls & -\omega_e M & Ms \\ Ms & \omega_e M & R+Ls & \omega_e L \\ -\omega_e M & Ms & -\omega_e L & R+Ls \end{bmatrix} \begin{bmatrix} I_{d1} \\ I_{q1} \\ I_{d2} \\ I_{q2} \end{bmatrix} + \omega_e \begin{bmatrix} 0 \\ \lambda_m \\ 0 \\ \lambda_m \end{bmatrix} \quad (4)$$

The electromagnetic torque $T_e$ for a non-salient may be represented by equation (5), below:

$$T_e = p\lambda_m(I_{q1}+I_{q2}) \quad (5)$$

Figure 4:
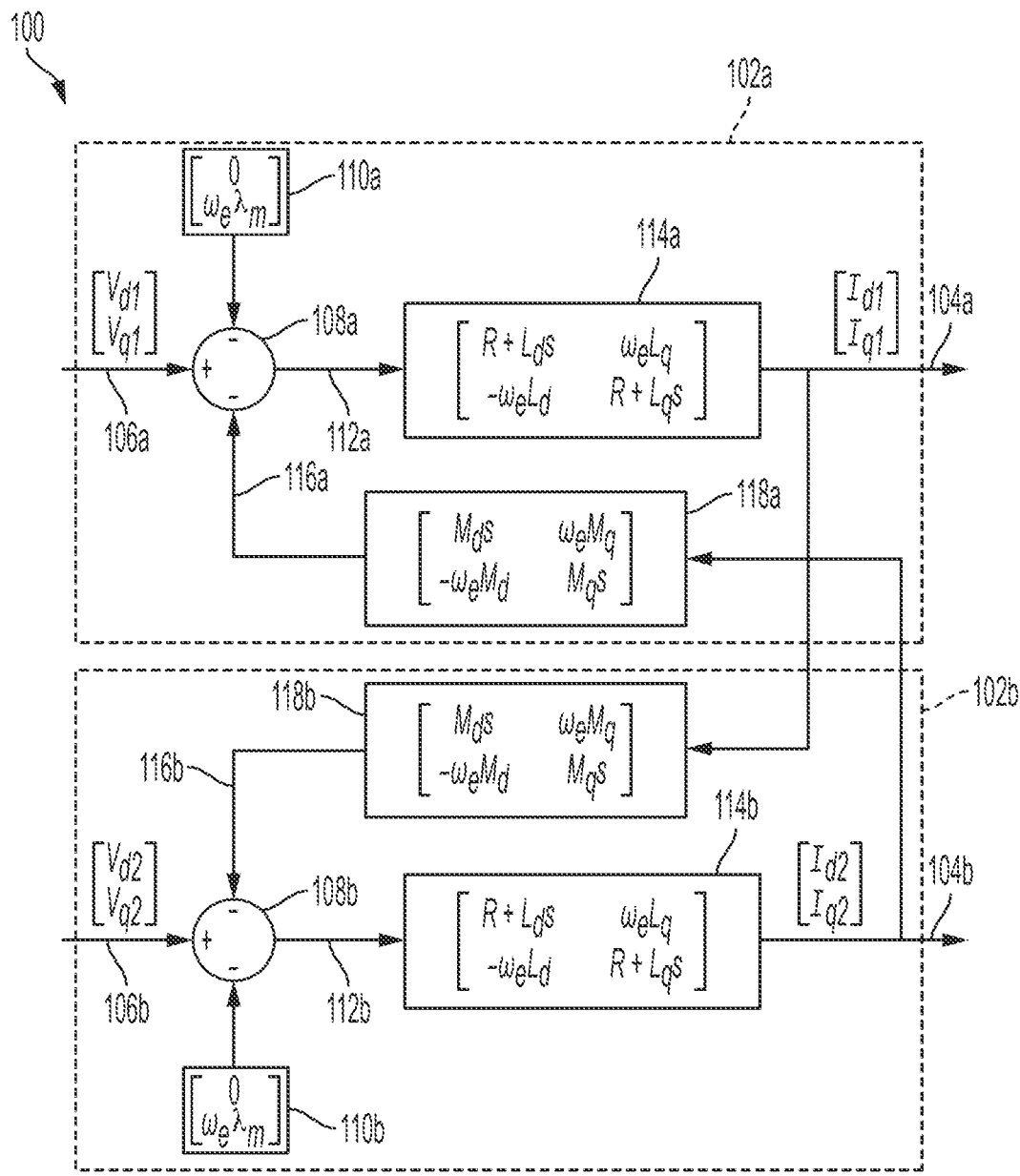
FIG. 4 is a block diagram representation of a mathematical model of a dual wound permanent magnet synchronous machine in the synchronous reference frame according to the principles of the present disclosure.

The two diagonal square matrices of equation (1) represent mathematical models of the individual windings sets, which is identical to that of a conventional single winding PMSM, while the off-diagonal matrices illustrate the coupling between the two sets of windings. A block diagram 100 representing this generalized mathematical model for a dual wound motor 60 is shown in FIG. 4.

Specifically, the block diagram 100 includes a first winding model 102a, and a second winding model 102b, with each of the winding models 102a, 102b representing operation of a corresponding one of the winding sets 62a, 62b of the dual wound motor 60. The first winding model 102a produces a first output signal 104a representing the first d-axis and q-axis currents $I_{d1}$, $I_{q1}$ generated by the first winding set 62a in response to a given first winding voltage signal 106a. Likewise, the second winding model 102b produces a second output signal 104b representing the second d-axis and q-axis currents $I_{d2}$, $I_{q2}$ generated by the second winding set 62b in response to a given second winding voltage signal 106b.

The first winding model 102a receives, as the first winding voltage signal 106a, a matrix with values for the first d-axis voltage $V_{d1}$ and the first q-axis voltage $V_{q1}$ applied to the first winding set 62a. This first winding voltage signal 106a is supplied to a first addition block 108a, which subtracts a first back-EMF (BEMF) signal 110a and produces a first composite signal 112a. The first composite signal 112a may represent a total sum of the voltages acting on the first winding set 62a. The first BEMF signal 110a represents BEMF generated by the first winding set 62a. The first composite signal 112a is supplied to a first transformation block 114a which generates the first output signal 104a based on the first composite signal 112a.

The second winding model 102b receives, as the second winding voltage signal 106b, a matrix with values for the second d-axis voltage $V_{d1}$ and the second q-axis voltage $V_{q1}$ applied to the second winding set 62b. This second winding voltage signal 106b is supplied to a second addition block 108b, which subtracts a second BEMF signal 110b and produces a second composite signal 112b. The second composite signal 112b may represent a total sum of the voltages acting on the second winding set 62b. The second BEMF signal 110b represents BEMF generated by the second winding set 62b. The second composite signal 112b is supplied to a second transformation block 114b which generates the second output signal 104b based on the second composite signal 112b.

The first winding model 102a also includes a first coupling transform block 118a that produces a first coupling voltage signal 116a based on the second output signal 104b. The first coupling voltage signal 116a represents effects on the first winding set 62a due to current in the second winding set 62b. The first coupling voltage signal 116a is supplied to the first addition block 108a, which reduces each component of the first composite signal 112a by a corresponding component value of the first coupling voltage signal 116a.

Likewise, the second winding model 102b also includes a second coupling transform block 118b that produces a second coupling voltage signal 116b based on the first output signal 104a. The second coupling voltage signal 116b represents effects on the second winding set 62b due to current in the first winding set 62a. The second coupling voltage signal 116b is supplied to the second addition block 108b, which reduces each component of the second composite signal 112b by a corresponding component value of the second coupling voltage signal 116b.

Figure 5:
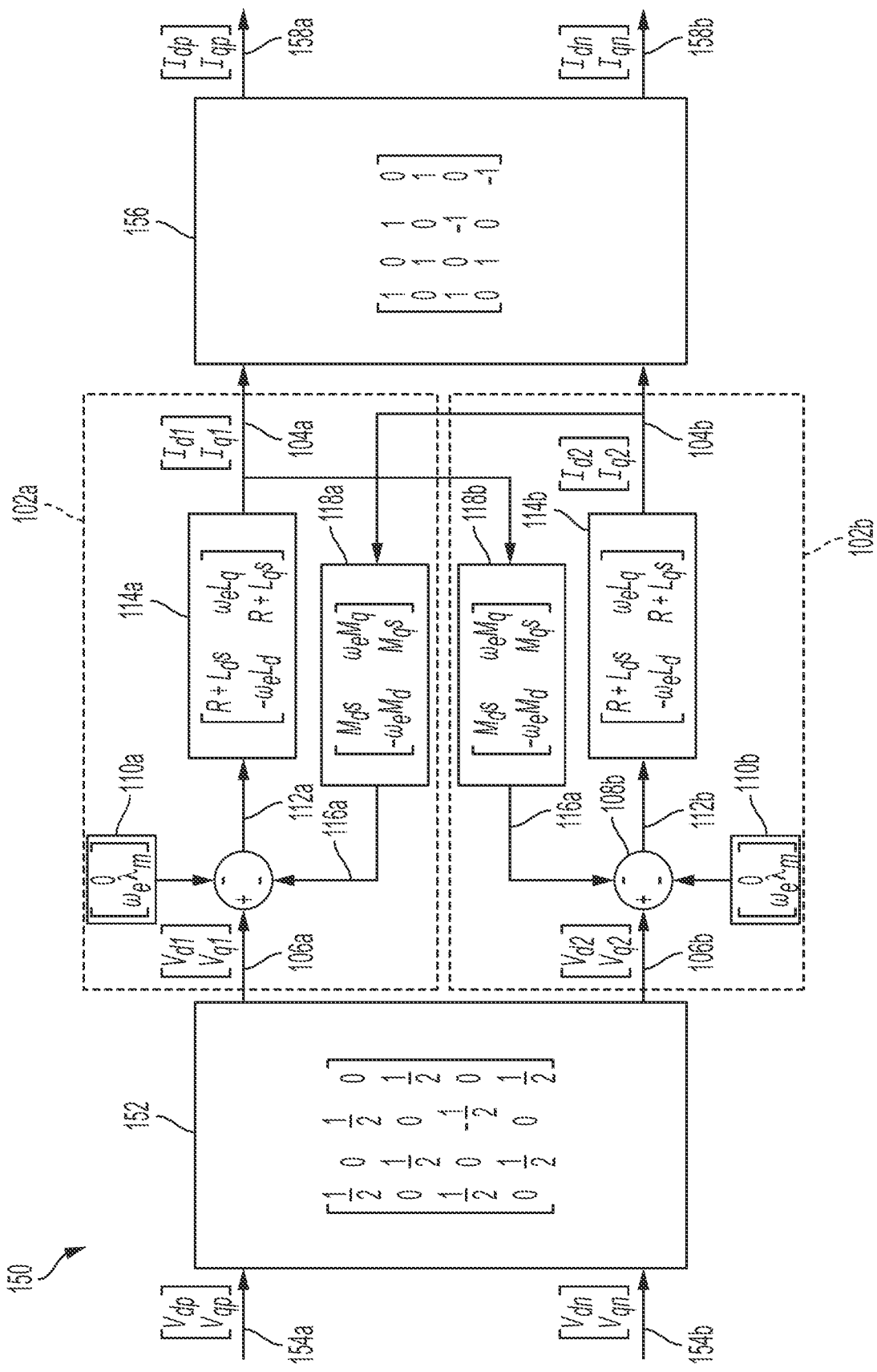
FIG. 5 is a block diagram representation of mathematical transformations for decoupling two half-motors of a dual wound permanent magnet synchronous motor according to the principles of the present disclosure.

Through mathematical manipulations shown in equations (6)-(8), below, the winding models 102a, 102b may be transformed, from a controls perspective, into two virtual-machines that are decoupled, as illustrated in FIG. 5.

$$X_{pn} = [R_f] X_{12} \quad (6)$$

$$X_{12} = [R_b] X_{pn} \quad (7)$$

$$R_b = R_f^{-1} \quad (8)$$

where $X_{pn}$ represents voltages or currents supplied to the positive and negative half-machines, $X_{12}$ represents a corresponding set of voltages or currents supplied to the winding sets 62a, 62b of the dual wound motor 60, $R_f$ represents a forward-direction transform and $R_b$ represents a backward-direction transform. Further, note that equation (8) shows that the backward-direction transform is the inverse of the forward-direction transform. In some embodiments, the forward-direction transform $R_f$ may take the form of the output transformation block 156. In some embodiments, the backward-direction transform $R_b$ may take the form of the input transformation block 152.

FIG. 5 shows a block diagram 150 of a dual wound PMSM model with these mathematical transformations applied on the voltage inputs and current outputs. Specifically, the block diagram 150 includes an input transformation block 152 that generates the first winding voltage signal 106a and the second winding voltage signal 106b based on a positive virtual half-motor voltage signal 154a and a negative virtual half-motor voltage signal 154b. The positive half-motor voltage signal 154a takes the form of 2×1 matrix with values for a d-axis voltage $V_{dp}$ and a q-axis voltage $V_{qp}$ supplied to the positive half-motor. Similarly, the negative half-motor voltage signal 154b takes the form of 2×1 matrix with values for a d-axis voltage $V_{dn}$ and a q-axis voltage $V_{qn}$ supplied to the negative half-motor.

The block diagram 150 also includes an output transformation block 156 that generates a positive virtual half-motor current signal 158a and a negative virtual half-motor current signal 158b based on the first output signal 104a from the first winding model 102a and based on the second output signal 104b from the second winding model 102b. The positive virtual half-motor current signal 158a takes the form of 2×1 matrix with values for a d-axis current $I_{dp}$ and a q-axis current $I_{qp}$. Similarly, the negative virtual half-motor current signal 158b takes the form of 2×1 matrix with values for a d-axis current $I_{dn}$ and a q-axis current $I_{qn}$.

With the transformations performed, the resultant machine model shown in equation (9) is obtained as follows:

$$\begin{bmatrix} V_{dp} \\ V_{qp} \\ V_{dn} \\ V_{qn} \end{bmatrix} = \begin{bmatrix} R + (L_d + M_d)s & \omega_e(L_q + M_q) & 0 & 0 \\ -\omega_e(L_d + M_d) & R + (L_q + M_q)s & 0 & 0 \\ 0 & 0 & R + (L_d - M_d)s & \omega_e(L_q - M_q) \\ 0 & 0 & -\omega_e(L_d - M_d) & R + (L_q - M_q)s \end{bmatrix} \begin{bmatrix} I_{dp} \\ I_{qp} \\ I_{dn} \\ I_{qn} \end{bmatrix} + \omega_e \begin{bmatrix} 0 \\ 2\lambda_m \\ 0 \\ 0 \end{bmatrix}. \quad (9)$$

The electromagnetic torque $T_e$ obtained as a result of the mathematical transformations may be expressed as shown in equation (10) as follows:

$$T_e = p(\lambda_m + ((L_q + M_q) - (L_d + M_d))I_{dp})I_{qp} \quad (10)$$

Figure 6:
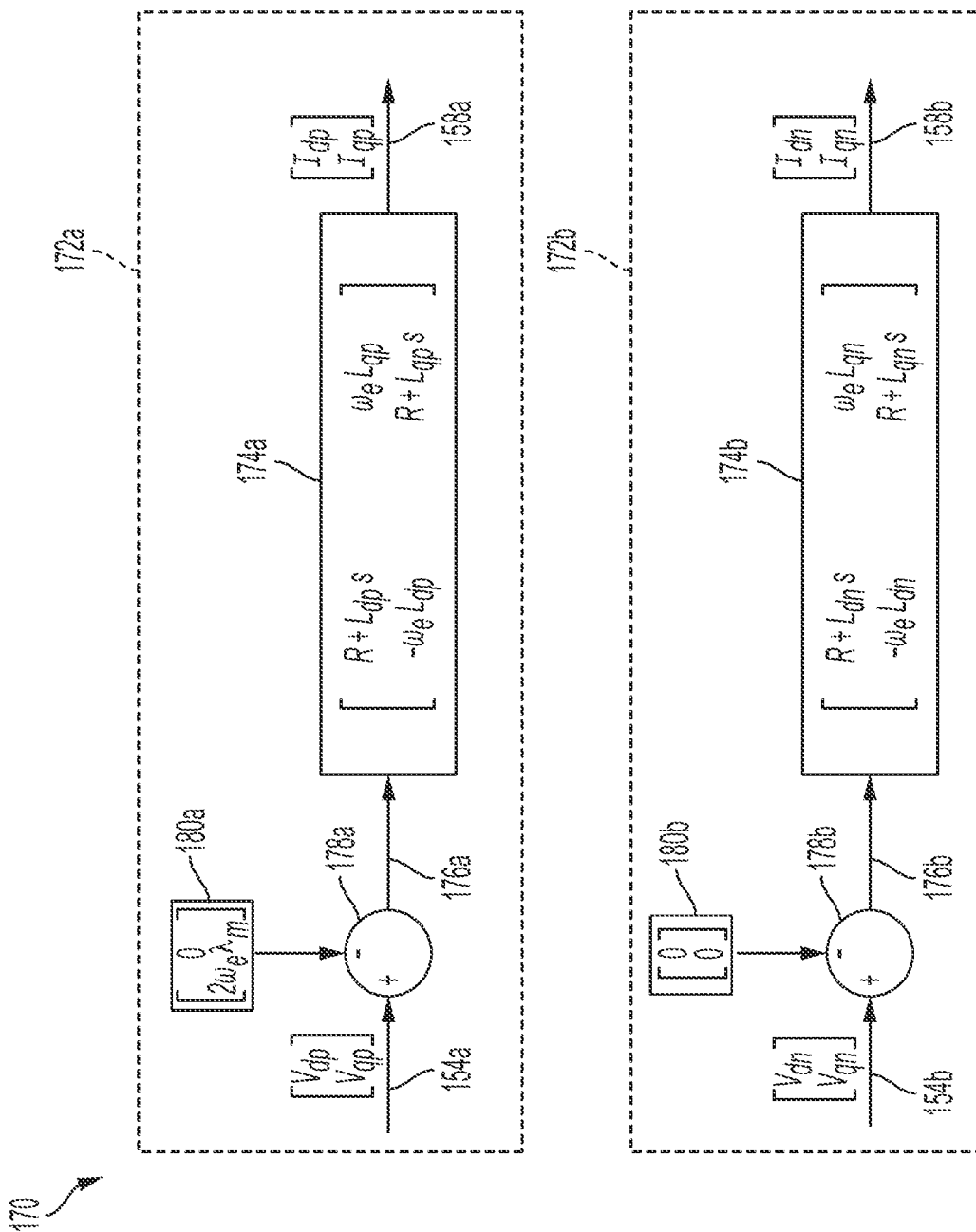
FIG. 6 is a block diagram showing a mathematical model showing two virtual half-motors of a dual wound permanent magnet synchronous motor resulting from the application of a decoupling transformation according to the principles of the present disclosure.

A block diagram representation of the decoupled model 170 is shown in FIG. 6. This decoupled model 170 may also be referred to as virtual model of dual wound PMSMs, as it illustrates two separate mathematical models that are independent of one another, and thus consists of a positive virtual half-motor and a negative virtual half-motor model that are decoupled from one another. Note that once the appropriate transformations related to the transformation matrices $R_p$, $R_b$ would need to be applied at the interfaces of the control algorithm blocks (not shown), the control algorithm design may be performed with the assumption that the "effective" motor (plant) from the standpoint of the controller is the decoupled model 170 of the dual wound motor 60 including positive and negative virtual half-motor windings 172a, 172b that are decoupled from one-another. Therefore, the decoupled model 170 includes a positive virtual motor winding 172a and a negative virtual motor winding 172b. The positive virtual motor winding 172a may also be called a positive virtual half-motor, and the negative virtual motor winding 172b may also be called a negative virtual half-motor.

The positive virtual motor winding 172a receives the positive virtual half-motor voltage signal 154a and produces the positive virtual half-motor current signal 158a. The positive virtual motor winding 172a includes a positive half-motor transfer matrix 174a that describes its dynamic behavior. The net voltage 176a resulting from the input voltage overcoming the BEMF voltage 180a, which is represented as a difference operation performed by the subtraction module 178a, serves as the input to the positive half-motor transfer matrix 174a which produces the positive virtual half-motor current signal 158a. Note that the positive half-motor BEMF voltage signal 180a includes a term $2\omega_e\lambda_m$, which incorporates both the BEMF signals 110a, 110b of the first and second winding models 102a, 102b, respectively.

The negative virtual motor winding 172b receives the negative virtual half-motor voltage signal 154b and produces the negative virtual half-motor current signal 158b. The negative virtual motor winding 172b includes a negative half-motor transfer matrix 174b that describes its dynamic behavior. The net voltage 176b resulting from the input voltage overcoming a voltage represented by a negative half-motor BEMF voltage signal 180b, which is represented as a difference result of a subtraction module 178b, serves as the input to the negative half-motor transfer matrix 174b which produces the negative virtual half-motor current signal 158b. Note that the negative half-motor BEMF voltage signal 180b includes a zero matrix, due to the positive half-motor BEMF voltage signal 180a incorporating both the BEMF signals 110a, 110b of the first and second winding models 102a, 102b, respectively. In other words, and unlike the positive virtual motor winding 172a, the negative virtual motor winding 172b does not include any BEMF compensation. The negative half-motor transfer matrix 174b is similar to the positive half-motor transfer matrix 174a, except for sign changes (positive to negative) in each of the elements.

With the transformations applied on the generalized model that results in the virtual motor windings 172a, 172b, the overall current regulation problem may be reduced to the regulation of the positive and negative virtual half-motor current signals 158a, 158b. The virtual motor windings 172a, 172b, each behave essentially the same as a typical single winding three-phase PMSM and thus, enhanced current regulation techniques may be employed for generating the corresponding half-motor voltage signals 154a, 154b.

The mathematical model of the positive and negative virtual half-machines may be generalized and written in a compact form as equation (11), below:

$$\begin{bmatrix} V_{dx} \\ V_{qx} \end{bmatrix} = \begin{bmatrix} L_{dx}s + R & \omega_e L_{qx} \\ -\omega_e L_{dx} & L_{qx}s + R \end{bmatrix} \begin{bmatrix} I_{dx} \\ I_{qx} \end{bmatrix} + u \begin{bmatrix} 0 \\ \omega_e \lambda_m \end{bmatrix} \quad (11)$$

where x may be replaced by either p or n and thus represents the positive or negative virtual half-machine, while u is a scalar quantity equal to 2 or 0 for the first and second virtual half-machine, respectively. The inductance terms for the two half machines may be expressed in terms of the self and coupling inductances of the dual wound motor 60 as shown in equations (12)-(15), as follows:

$$L_{dp} = L_d + M_d \quad (12)$$

$$L_{qp} = L_q + M_q \quad (13)$$

$$L_{dn} = L_d - M_d \quad (14)$$

$$L_{qn} = L_q - M_q \quad (15)$$

The motor controllers 70, 72a, 72b may include a current command generator, a current regulator, and a power converter controller. The current command generator is configured to generate a current command based on the motor torque command $T_e^*$. The current command generator may limit the torque produced based on machine capability and power management algorithms. The current regulator may perform closed loop or feedback current control techniques to control the amount of current generated by the DW-PMSMs. The current controller may be a primary focus of the present disclosure, as the current controller may implement the techniques presented to take into account inductive coupling between the two half-machines of the DW-PMSMs. The power converter controller may convert d-axis and q-axis voltage commands from the current regulator into duty cycles that are then sent to the gate driver and inverter which in-turn apply the required voltages to the winding sets 62a, 62b of the dual wound motor 60.

The compensation modules 306, 308, and 310 make up a matrix-valued (or, multi-dimensional) proportional-integral (PI) controller that compensates for a difference current $\bar{I}_E$ between a commanded current $\bar{I}^*$ and the measured current $\bar{I}$ to control the virtual motor winding 172a, 172b. The commanded current $\bar{I}^*$ may be a corresponding positive virtual half-motor current command $\bar{I}_p^*$ or a negative virtual half-motor current command $\bar{I}_n^*$. The positive virtual half-motor current command $\bar{I}_p^*$ and the negative virtual half-motor current command $\bar{I}_n^*$ may be calculated based on first and second motor current commands $\bar{I}_1^*$, $\bar{I}_2^*$ for the winding sets 62a, 62b of the dual wound motor 60 using a third mathematical transformation (not shown in the drawings). This third mathematical transformation may be similar or identical to the output transformation block 156 of block diagram 150 shown on FIG. 5. The positive virtual half-motor current command $\bar{I}_p^*$ or a negative virtual half-motor current command $\bar{I}_n^*$ may be computed from equation (10) using a commanded torque $T_e^*$ and applying "conventional" current command calculation.

Figure 7:
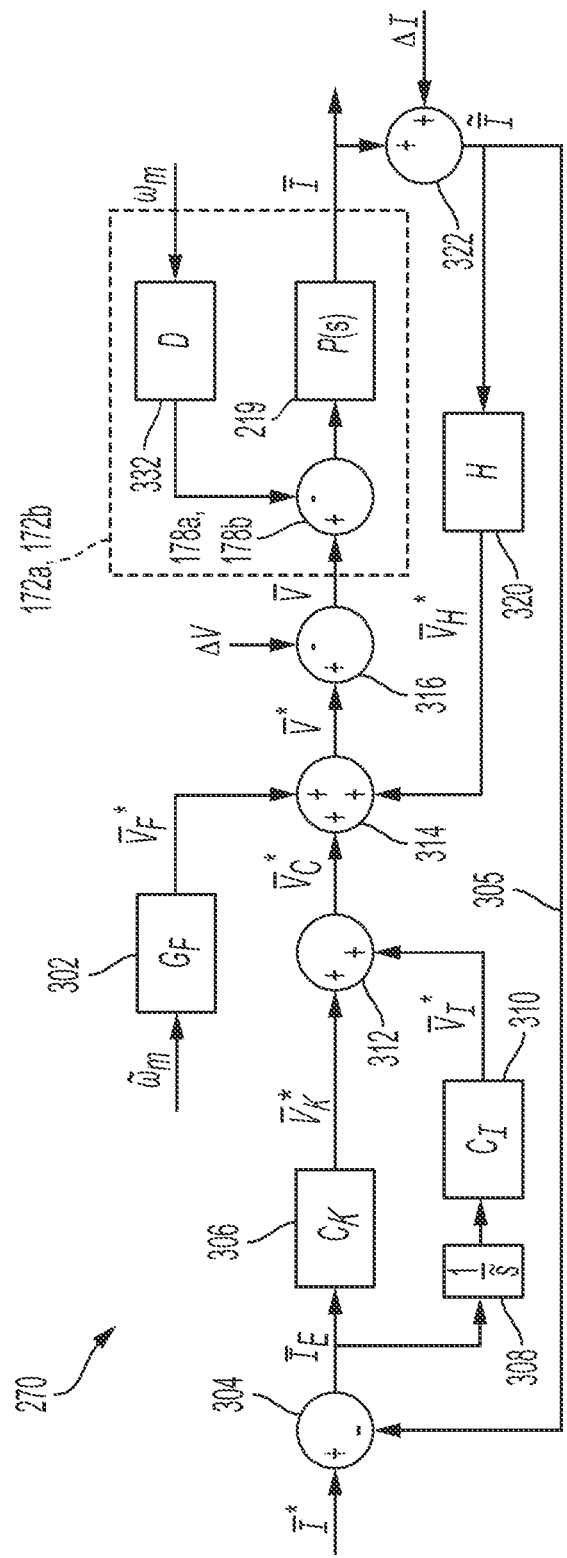
FIG. 7 is a block diagram showing a generalized motor current control system, according to the principles of the present disclosure.

FIG. 7 is a block diagram showing a generalized motor control system 270 with two degrees of freedom (2DOF), according to the principles of the present disclosure. As shown, the motor control system 270 includes several sub-modules—a BEMF compensation module 302, a proportional compensation module 306, an integration module 308, an integral gain module 310, a feedback compensator 320, a subtraction module 304, and addition modules 312, 314, 316. The integration module 308 and the integral gain module 310 may be collectively called an integral compensation controller 308, 310. FIG. 7 also includes a virtual motor winding 172a, 172b that includes a generalized virtual motor winding, as modeled by a plant model P(s). The virtual motor winding 172a, 172b also includes a disturbance voltage, such as a BEMF voltage, which is a function of the rotor mechanical velocity $\omega_m$, and is modeled by a disturbance function D. The plant model P(s) takes, as an input, a difference between a motor voltage $\nabla$ and the disturbance voltage. The inverter 264 between the motor control system 270 and the virtual motor winding 172a, 172b is not depicted in FIG. 7 for the simplicity of illustration and description.

The virtual motor winding 172a, 172b receives a motor voltage $\nabla$ and generates torque (i.e., draws or produces an output current $\tilde{I}$, which is the actual motor current as described above by reference to FIGS. 1 and 2). The motor control system 270 makes up a closed-loop system that has a certain frequency response characteristic. As can be appreciated, the frequency response of the closed-loop system is governed by a set of model equations that defines a transfer function that transforms the input current command $\tilde{I}^*$ to the output current $\tilde{I}$. In other words, the motor control system 270 regulates the output current $\tilde{I}$, by sending the motor voltage $\nabla$ generated based on the input current command $\tilde{I}^*$.

The motor control system 270 is a feedback controller having a closed loop. That is, the output current $\tilde{I}$ of the virtual motor winding 172a, 172b is measured and fed back to the motor control system 270 and the motor control system 270 uses the feedback to regulate the output of the virtual motor winding 172a, 172b. The measured current $\tilde{I}$, which may also be called a feedback current, is represented by a feedback signal 305 produced by a current sensor (not shown). The measured current $\tilde{I}$ includes the output current $\tilde{I}$, plus some disturbance or noise current, $\Delta I$, which may be introduced in the measurement.

The feedback compensator 320 takes as input, the measured current $\tilde{I}$ and generates a feedback path voltage command $\nabla_H^*$ using a matrix H.

The BEMF compensation module 302 is configured to compensate for dynamics (e.g., variations) of BEMF voltage that are slower than the dynamics of the currents of the virtual motor winding 172a, 172b. Specifically, the BEMF compensation module 302 takes as input the rotor mechanical velocity $\omega_m$ and outputs a BEMF compensation voltage $\nabla_F^*$ that compensates for the dynamics of the BEMF voltage.

The feedback path voltage command $\nabla_H^*$ is combined by the addition module 314 with the BEMF compensation voltage $\nabla_F^*$ and with a forward path voltage command $\nabla_C^*$ from the proportional compensation module 306 and the integral compensation controller 308, 310 to produce a final voltage command $\nabla^*$ that causes the virtual motor winding 172a, 172b to draw current in a stable manner that is not affected by the resistance of the virtual motor winding 172a, 172b or any inaccurate estimation of the resistance. The addition module 316 combines the final voltage command $\nabla^*$ and a disturbance voltage $\Delta V$ to produce the motor voltage $\nabla$ supplied to the virtual motor winding 172a, 172b.

The proportional compensation module 306 produces a proportional voltage command $\nabla_K^*$ from the difference current $\tilde{I}_E$ (determined by the subtraction module 304). The integral compensation controller 308, 310 includes an integration module 308 and an integral gain module 310 and produces an integral voltage command $\nabla_I^*$. The addition module 312 combines the proportional voltage command $\nabla_K^*$ and the integral voltage command $\nabla_I^*$ to produce the forward path voltage command $\nabla_C^*$. The proportional voltage command $\nabla_K^*$ and the integral voltage command $\nabla_I^*$ may be determined in such a way that the combined forward path voltage command $\nabla_C^*$, when applied to the virtual motor winding 172a, 172b, causes the overall current to current transfer function to be of a specific, desired order. It is to be noted that each of $\tilde{I}^*$, $\tilde{I}$, $\tilde{I}_E$, $\nabla_K^*$, $\nabla_I^*$, and $\nabla_C^*$ has a d-axis component and a q-axis component. Also, $\tilde{I}^*$, $\tilde{I}$, $\tilde{I}_E$, $\nabla_K^*$, $\nabla_I^*$, and $\nabla_C^*$ represent vectors and not scalar values.

The proportional compensation module 306 is a proportional controller and the integral compensation controller 308, 310 is an integral controller. The proportional compensation module 306, also called $C_K$, aids in configuring the frequency response of the closed-loop system when the first order type response is desired, in addition to providing beneficial tradeoffs between the motor input disturbance transfer function behavior and the current measurement noise transfer function behavior. When a higher order transfer function (e.g., a third order) is desired, a different configuration than the PI controller is utilized.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 7 may be combined and/or further partitioned.

Figure 8:
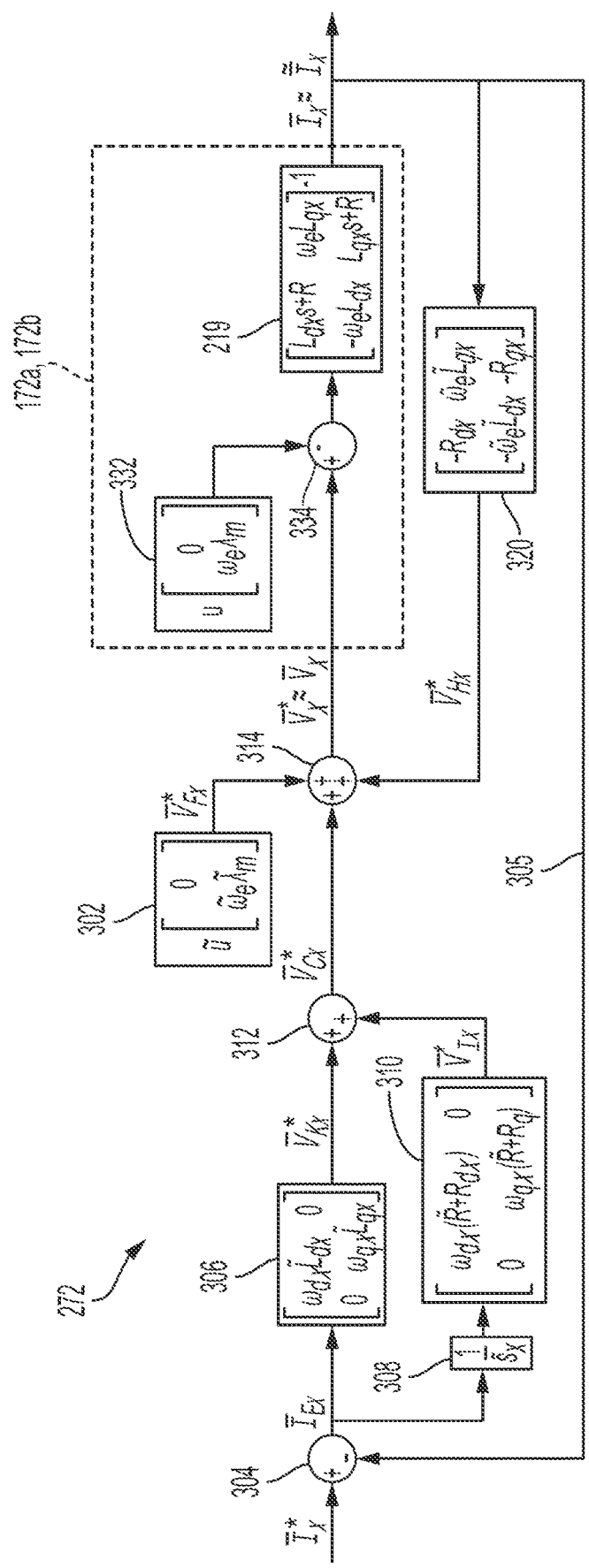
FIG. 8 is a block diagram showing a motor current control system utilizing state feedback decoupling control configuration, according to the principles of the present disclosure.

FIG. 8 is a block diagram showing a state feedback motor control system 272 utilizing a state feedback decoupling technique. The state feedback decoupling technique utilizes the parameters of the feedback compensator 320 to compensate for mutual inductance effects between the virtual motor windings 172a, 172b. Thus, the state feedback decoupling technique enables controlling the dual wound motor 60 with d-axis and q-axis currents of each winding set 62a, 62b being decoupled from one another and decoupled from the currents in the other winding set 62a, 62b.

The state feedback motor control system 272 of FIG. 8 is similar to the motor control system 270 of FIG. 7, with additional details and parameters to implement the state feedback decoupling control technique. The virtual motor winding 172a, 172b includes a winding model 219 configured to calculate the output current $\tilde{I}$ as a function of a voltage $\nabla$ applied to the virtual motor winding 172a, 172b. The output current $\tilde{I}$ is equal to, or approximately equal to the measured current $\tilde{I}$, which may have d-axis and q-axis components. For example, the measured current $\tilde{I}_p$ of the positive virtual motor winding 172a may be represented as positive virtual half-motor currents $\tilde{I}_{dp}$, $\tilde{I}_{qp}$, and the measured current $\tilde{I}_n$ of the negative virtual motor winding 172b may be represented as negative virtual half-motor currents $\tilde{I}_{dn}$, $\tilde{I}_{qn}$.

An applied voltage supplied to the winding model 219 is determined as a vector sum of a motor voltage $\nabla_x$ and a BEMF voltage produced by the windings of the virtual half-motor 102a, 102b and is represented as a difference operation performed by the subtraction module 334. The motor voltage $\nabla_x$ may be equal to, or approximately equal to, the final voltage command $\nabla_x^*$. The BEMF voltage may be determined by a BEMF model 332 of the virtual motor winding 172a, 172b. In some embodiments, the BEMF compensation may be applied to only one of the two virtual motor windings 172a, 172b for controlling the dual wound motor 60.

The winding model 219 may be expressed by the plant model $P_x(s)$, shown in equation (16) as follows:

$$P_x(s) = \begin{bmatrix} L_{dx}s + R & \omega_e L_{qx} \\ -\omega_e L_{dx} & L_{qx}s + R \end{bmatrix}^{-1} \quad (16)$$

where x represents one of p or n for the positive virtual motor winding 172a or the negative virtual motor winding 172b, respectively.

The BEMF model 332 may be expressed by the function $D_x$ shown in equation (17) as follows:

$$D_x = -u \begin{bmatrix} 0 \\ \omega_e \lambda_m \end{bmatrix} \quad (17)$$

and where the negative sign on the right side of equation (17) is represented by the difference operation performed by the subtraction module 334.

The BEMF compensation module 302 may be implemented using equation (18), below:

$$G_F = \tilde{u} \begin{bmatrix} 0 \\ \tilde{\omega}_e \tilde{\lambda}_m \end{bmatrix} \quad (18)$$

The matrix H of the feedback compensator 320 in the state feedback motor control system 272 may be implemented using equation (19), below:

$$H = \begin{bmatrix} -R_{dx} & \tilde{\omega}_e \tilde{L}_{qx} \\ -\tilde{\omega}_e \tilde{L}_{dx} & -R_{qx} \end{bmatrix} \quad (19)$$

where x is p or n for the corresponding one of the positive virtual motor winding 172a or the negative virtual motor winding 172b. The cross-diagram terms $-\tilde{\omega}_e \tilde{L}_{dx}$, $\tilde{\omega}_e \tilde{L}_{qx}$, of the state feedback matrix H are used for the decoupling, while the remaining terms are virtual resistances that enhance disturbance rejection and robustness.

The proportional compensation module 306, and the integral compensation controller 308, 310 in the state feedback motor control system 272 may be implemented using the transfer functions $C_K$, and $C_I$ as shown in equations (20) and (21), below:

$$C_K = \begin{bmatrix} \omega_{dx} \tilde{L}_{dx} & 0 \\ 0 & \omega_{qx} \tilde{L}_{qx} \end{bmatrix} \quad (20)$$

$$C_I = \begin{bmatrix} \omega_{dx}(\tilde{R} + R_{dx}) & 0 \\ 0 & \omega_{qx}(\tilde{R} + R_{qx}) \end{bmatrix} \quad (21)$$

where x is p or n for the corresponding one of the positive virtual motor winding 172a or the negative virtual motor winding 172b. $C_K$ and $C_I$ are proportional-integral (PI) controllers that include gains selected to cancel the poles of the modified "effective" plant (which becomes effectively decoupled) such that both the d and q axis closed loop current control loops exhibit first order low pass filter responses with a tunable cutoff frequency that are represented by the targeted closed loop bandwidth terms $\omega_d$ and $\omega_q$.

Figure 9:
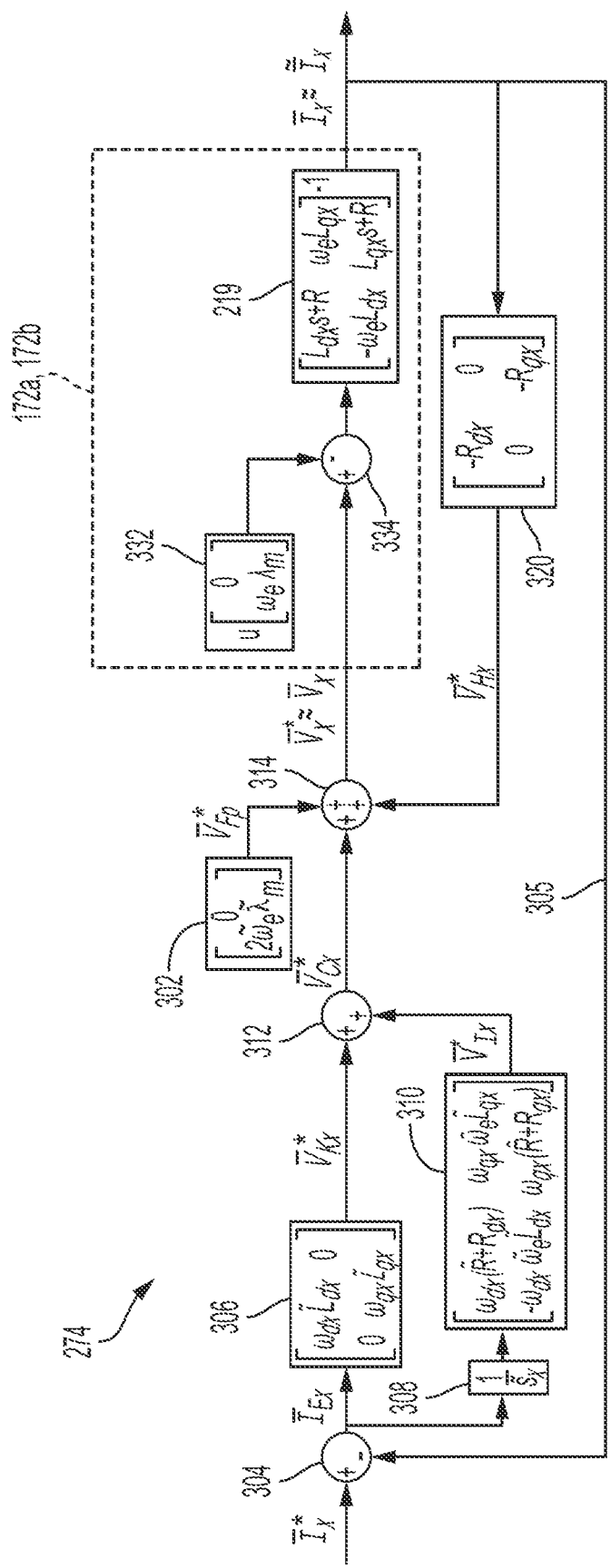
FIG. 9 is a block diagram showing a motor current control system utilizing plant inversion decoupling control configuration, according to the principles of the present disclosure.

FIG. 9 is a block diagram showing a plant inversion decoupling motor control system 274 utilizing a plant inversion decoupling technique. The plant inversion decoupling technique utilizes parameters of the proportional compensation module 306 and the integral compensation controller 308, 310 to compensate for mutual inductance effects between the two virtual motor windings 172a, 172b. Thus, the plant inversion decoupling technique enables controlling the dual wound motor 60 with d-axis and q-axis currents of each winding set 62a, 62b being decoupled from one another and decoupled from the currents in the other winding set 62a, 62b. The plant inversion decoupling motor control system 274 of FIG. 9 is similar to the state feedback motor control system 272 of FIG. 8, with parameters changed to implement the plant inversion decoupling technique.

The matrix H of the feedback compensator 320 in the plant inversion decoupling motor control system 274 may be implemented using matrix (22), below:

$$H = \begin{bmatrix} -R_{dx} & 0 \\ 0 & -R_{qx} \end{bmatrix} \quad (22)$$

The proportional compensation module 306, and the integral compensation controller 308, 310 in the plant inversion decoupling motor control system 274 may be implemented using the transfer functions $C_K$, and $C_I$ as shown in equations (23) and (24), below:

$$C_K = \begin{bmatrix} \omega_{dx} \tilde{L}_{dx} & 0 \\ 0 & \omega_{qx} \tilde{L}_{qx} \end{bmatrix} \quad (23)$$

$$C_I = \begin{bmatrix} \omega_{dx}(\tilde{R} + R_{dx}) & \omega_{qx} \tilde{\omega}_e \tilde{L}_{qx} \\ -\omega_{dx} \tilde{\omega}_e \tilde{L}_{dx} & \omega_{qx}(\tilde{R} + R_{qx}) \end{bmatrix} \quad (24)$$

where x is p or n for the corresponding one of the positive virtual motor winding 172a or the negative virtual motor winding 172b. The cross-diagram terms, $-\omega_{dx} \tilde{\omega}_e \tilde{L}_{dx}$, and $\omega_{qx} \tilde{\omega}_e \tilde{L}_{qx}$ of the integral controller transfer function $C_I$ are used for the decoupling. Additionally or alternatively, terms of the proportional controller transfer function $C_K$ may be used for decoupling.

FIGS. 10A-10B are block diagrams illustrating current control modules 280, 282 controlling both the positive and negative virtual motor windings 172a, 172b of a decoupled model 170 of the dual wound motor 60 using the state feedback decoupling control configuration. Specifically, FIG. 10A shows a first current control module 280 controlling the positive virtual motor winding 172a, with matrix parameters of its feedback compensator 320 configured to implement the state feedback decoupling technique. FIG. 10B shows a second current control module 282 controlling the negative virtual motor winding 172b, with matrix parameters of its feedback compensator 320 configured to implement the state feedback decoupling technique.

Figure 11A:
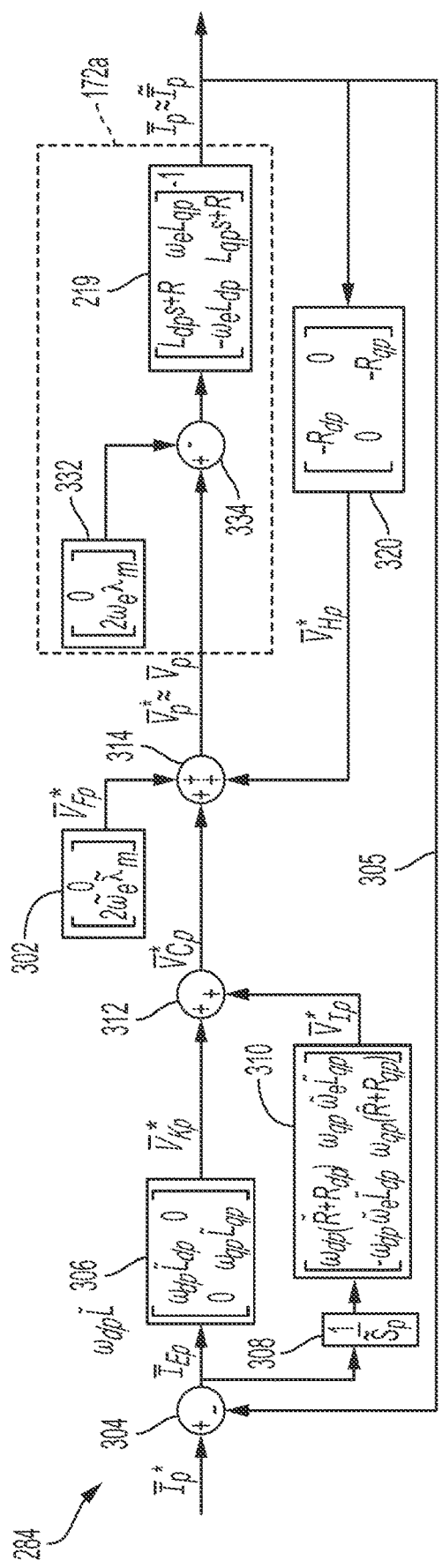
FIGS. 11A-11B are block diagrams illustrating a current control module controlling both the positive and negative virtual half-motors of a dual wound motor using the plant inversion decoupling control configuration, according to the principles of the present disclosure.
Figure 11B:
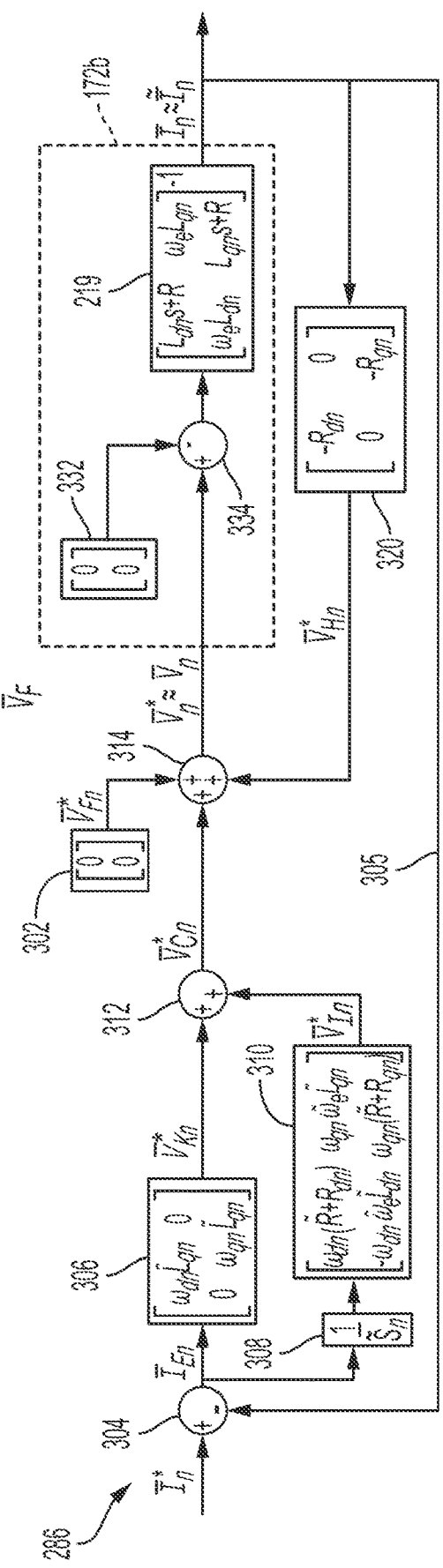

FIGS. 11A-11B are block diagrams illustrating a third current control module 284 and a fourth current control module 286 controlling both the positive and negative virtual motor windings 172a, 172b of a decoupled model 170 of the dual wound motor 60 using the plant inversion decoupling control configuration. Specifically, FIG. 11A shows a third current control module 284 controlling the positive virtual motor winding 172a, with matrix parameters of its integral gain module 310 configured to implement the plant inversion decoupling technique. FIG. 11B shows a fourth current control module 286 controlling the negative virtual motor winding 172b, with matrix parameters of its integral gain module 310 configured to implement the plant inversion decoupling technique.

FIG. 12A-12B are block diagrams illustrating a fifth current control module 288 and a sixth current control module 290 controlling the positive and negative virtual motor windings 172a, 172b of a virtual model 170 representing the dual wound motor 60 using the plant inversion and state feedback decoupling control configurations, respectively. FIG. 12A shows a fifth current control module 288 controlling the positive virtual motor winding 172a, with matrix parameters of its feedback compensator 320 configured to implement the state feedback decoupling technique; and FIG. 12B shows a sixth current control module 290 controlling the negative virtual motor winding 172b, with matrix parameters of its integral gain module 310 configured to implement the plant inversion decoupling technique. This is merely an example, showing that different decoupling techniques can be used and combined in different arrangements for controlling a dual wound motor 60.

Figure 13A:
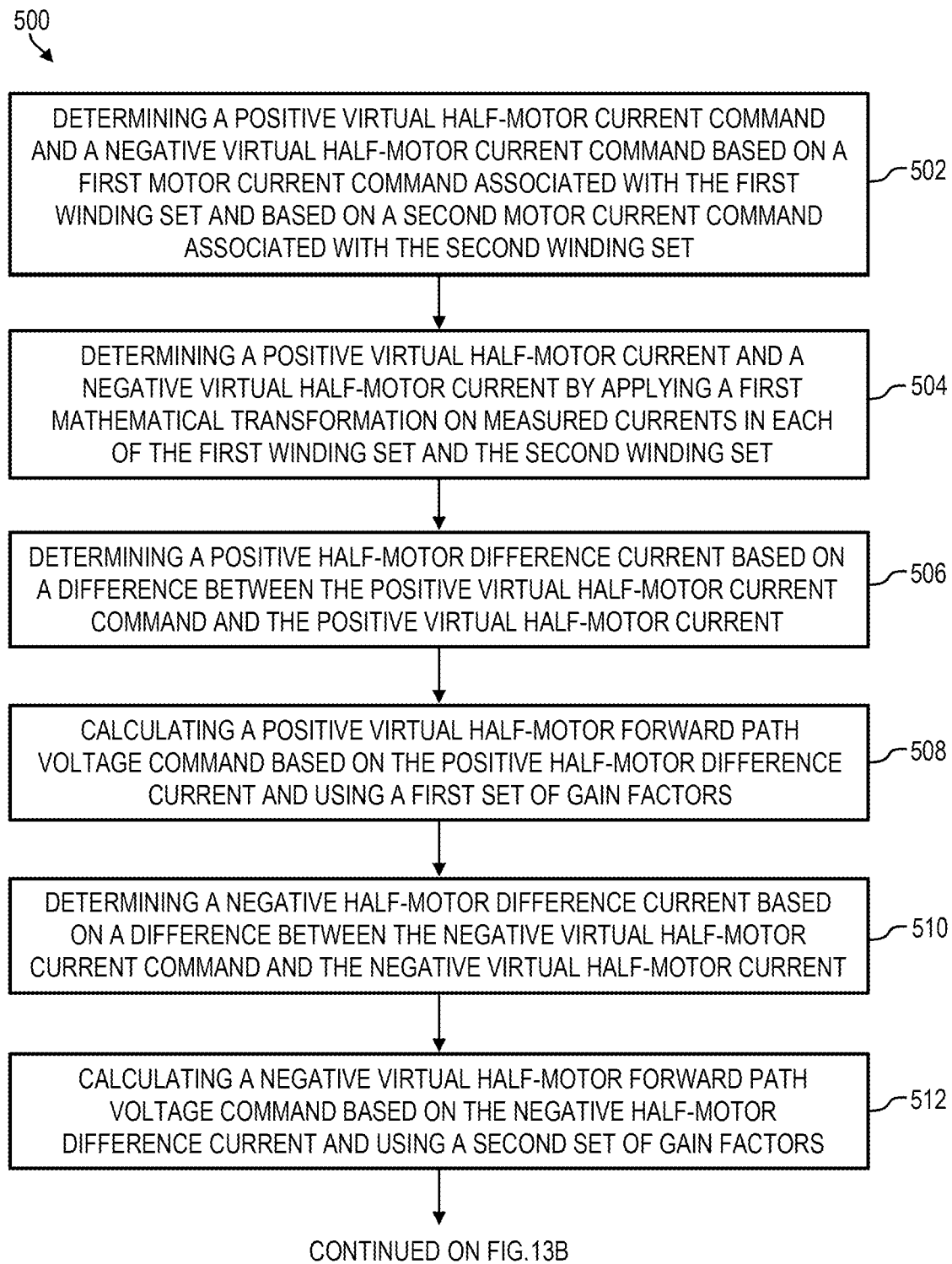
FIGS. 13A-13C show a flow diagram illustrating a method for controlling a dual wound electric motor, according to the principles of the present disclosure.
Figure 13B:
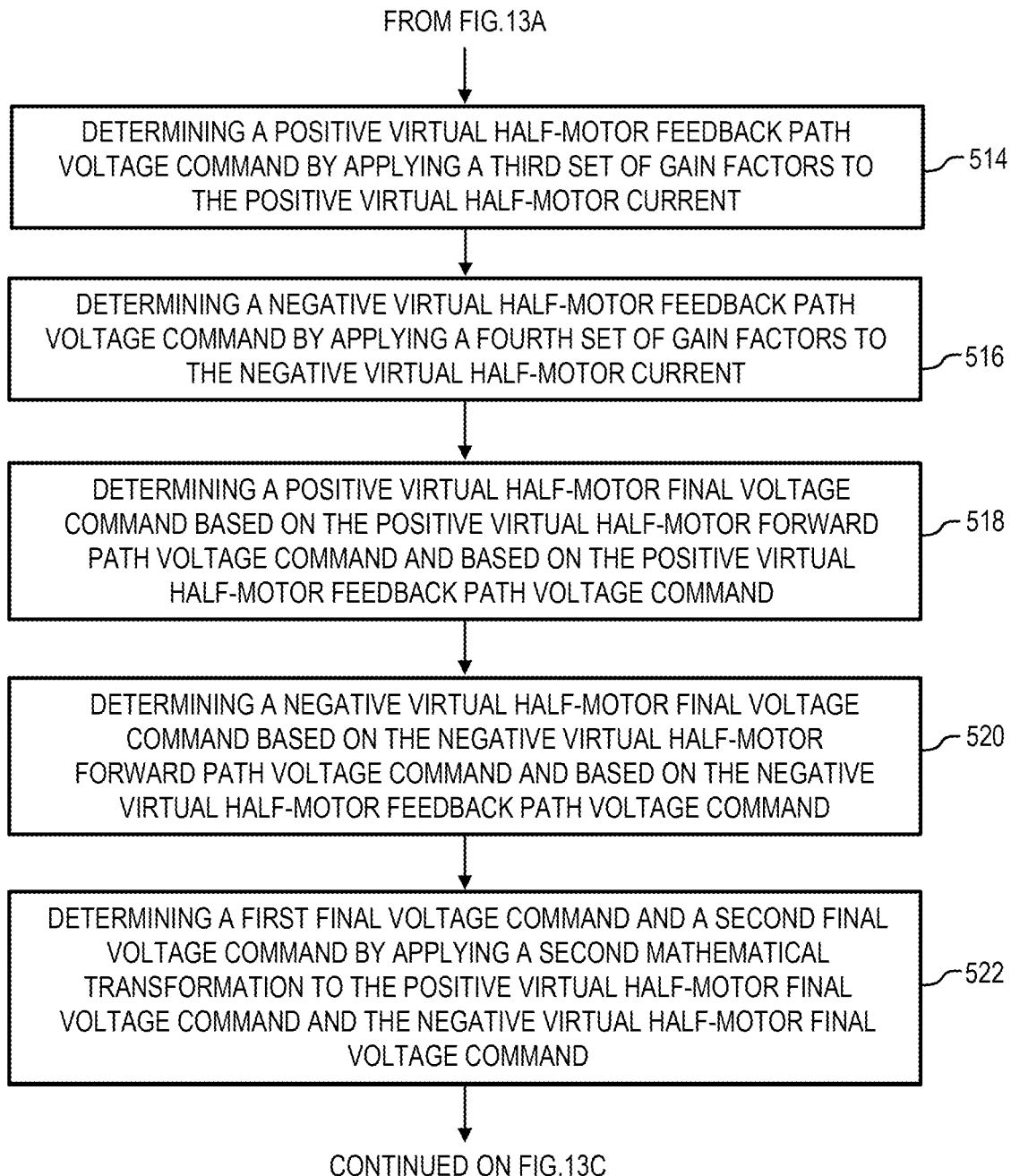
Figure 13C:
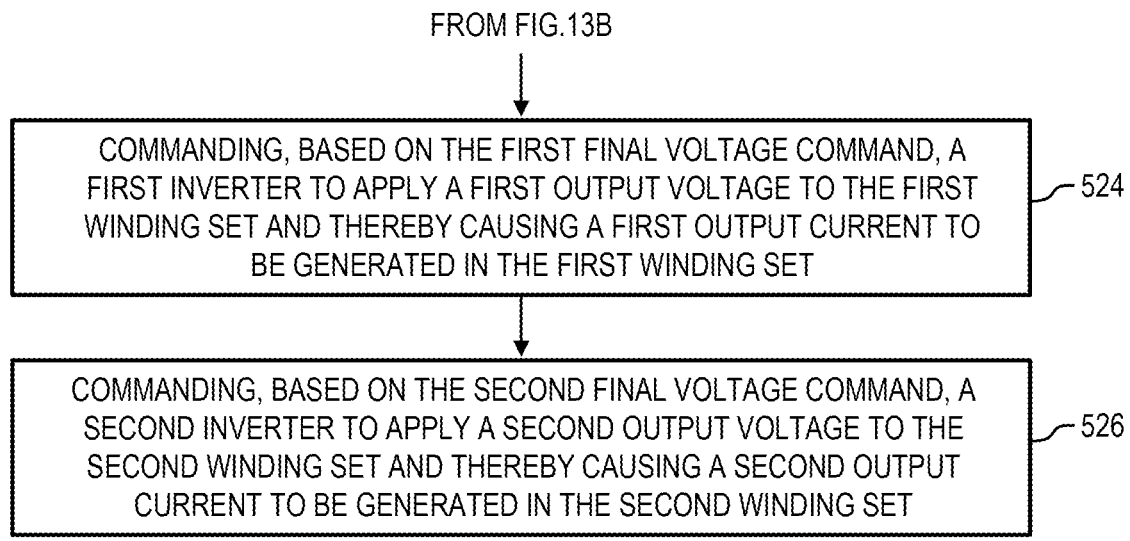

FIGS. 13A-13C show a flow diagram illustrating a method 500 for controlling a dual wound synchronous machine (DWSM), also called a dual wound motor 60, having a first winding set 62a and a second winding set 62b according to the principles of the present disclosure. The method 500 can be performed by the motor controller 70, in accordance with some embodiments of the present disclosure. As can be appreciated in light of the disclosure, the order of operation within the method is not limited to the sequential execution as illustrated in FIG. 13, but may be performed in one or more varying orders as applicable and in accordance with the present disclosure.

At 502, the method 500 determines a positive virtual half-motor current command $\bar{I}_p^*$ and a negative virtual half-motor current command $\bar{I}_n^*$ based on a first motor current command $\bar{I}_1^*$ associated with the first winding set 62a and based on a second motor current command $\bar{I}_2^*$ associated with the second winding set 62b. For example, the motor controller 70 may implement a mathematical transformation to calculate the positive virtual half-motor current command $\bar{I}_p^*$ and the negative virtual half-motor current command $\bar{I}_n^*$ based on each of a first motor current command $\bar{I}_1^*$ associated with the first winding set 62a and based on a second motor current command $\bar{I}_2^*$ associated with the second winding set 62b. This mathematical transformation used to calculate the positive virtual half-motor current command $\bar{I}_p^*$ and the negative virtual half-motor current command $\bar{I}_n^*$ based on the first and second motor current commands $\bar{I}_1^*$, $\bar{I}_2^*$ may be similar or identical to the output transformation block 156 of block diagram 150 shown on FIG. 5.

At 504, the method 500 determines a positive virtual half-motor current $\bar{I}_p$ and a negative virtual half-motor current $\bar{I}_n$ by applying a first mathematical transformation on measured currents in each of the first winding set 62a and the second winding set 62b. The positive virtual half-motor current corresponds to a positive virtual motor winding associated with the DWSM, and the negative virtual half-motor current corresponding to a negative virtual motor winding associated with the DWSM. For example, the motor controller 70 may implement a first mathematical transformation, which may be similar or identical to the output transformation block 156 of the block diagram 150 shown on FIG. 5 to calculate the positive virtual half-motor current $\bar{I}_p$ and the negative virtual half-motor current $\bar{I}_n$ based on the first measured current signal $\tilde{I}_1$ representing current in the first winding set 62a and based the second measured current signal $\tilde{I}_2$ representing current in the second winding set 62b.

At 506, the method 500 determines a positive half-motor difference current $\bar{I}_{Ep}$ based on a difference between the positive virtual half-motor current command $\bar{I}_p^*$ and the positive virtual half-motor current $\bar{I}_p$. For example, and with reference to FIG. 10A, the motor controller 70 may implement the subtraction module 304 to determine the positive virtual half-motor difference current $\bar{I}_{Ep}$ as a difference between the positive virtual half-motor current command $\bar{I}_p^*$ and the positive virtual half-motor current $\bar{I}_p$.

At 508, the method 500 calculates a positive virtual half-motor forward path voltage command $\bar{V}_{Cp}^*$ based on the positive half-motor difference current $\bar{I}_{Ep}$ and using a first set of gain factors. For example, and with reference to FIG. 10A, the motor controller 70 may implement the proportional compensation module 306 to calculate the positive virtual half-motor proportional voltage command $\bar{V}_{Kp}^*$ by applying at least a portion of the first set of gain factors to the positive virtual half-motor difference current $\bar{I}_{Ep}$. Additionally or alternatively, the motor controller 70 may implement the integral gain module 310 to calculate the positive virtual half-motor integral voltage command $\bar{V}_{Ip}$ by applying at least a portion of the first set of gain factors to the integrated difference signal produced by the integration module 308 to produce a positive virtual half-motor integral voltage command $\bar{V}_{Ip}^*$. In some embodiments, and as shown in FIG. 10A, calculating the positive virtual half-motor forward path voltage command $\bar{V}_{Cp}^*$ may also include the motor controller 70 implementing the addition module 312 to produce the positive virtual half-motor forward path voltage command $\bar{V}_{Cp}^*$ as the sum of the positive virtual half-motor proportional voltage command $\bar{V}_{Kp}^*$ and the positive virtual half-motor integral voltage command $\bar{V}_{Ip}^*$. However, in some other embodiments, the positive virtual half-motor forward path voltage command $\bar{V}_{Cp}$ may include only one of the positive virtual half-motor proportional voltage command $\bar{V}_{Kp}$ or the positive virtual half-motor integral voltage command $\bar{V}_{Ip}^*$.

At 510, the method 500 determines a negative half-motor difference current $\bar{I}_{En}$ based on a difference between the negative virtual half-motor current command $\bar{I}_n^*$ and the negative virtual half-motor current $\bar{I}_n^*$. For example, and with reference to FIG. 10B, the motor controller 70 may implement the subtraction module 304 to determine the negative virtual half-motor difference current $\bar{I}_{En}$ as a difference between the negative virtual half-motor current command $\bar{I}_n^*$ and the negative virtual half-motor current $\bar{I}_n$.

At 512, the method 500 calculates a negative virtual half-motor forward path voltage command $\bar{V}_{Cn}^*$ based on the negative half-motor difference current $\bar{I}_{En}$ and using a second set of gain factors. For example, and with reference to FIG. 10B, the motor controller 70 may implement the proportional compensation module 306 to calculate the negative virtual half-motor proportional voltage command $\bar{V}_{Kn}^*$ by applying at least a portion of the second set of gain factors to the negative virtual half-motor difference current $\bar{I}_{En}$. Additionally or alternatively, the motor controller 70 may implement the integral gain module 310 to calculate the negative virtual half-motor integral voltage command $\bar{V}_{In}$ by applying at least a portion of the second set of gain factors to the integrated difference signal produced by the integration module 308 to produce a negative virtual half-motor integral voltage command $\overline{V}_{In}^*$. In some embodiments, and as shown in FIG. 10B, calculating the negative virtual half-motor forward path voltage command $\overline{V}_{Cn}^*$ may also include the motor controller 70 implementing the addition module 312 to produce the negative virtual half-motor forward path voltage command $\overline{V}_{Cn}^*$ as the sum of the negative virtual half-motor proportional voltage command $\overline{V}_{Kn}^*$ and the negative virtual half-motor integral voltage command $\overline{V}_{In}^*$. However, in some other embodiments, the negative virtual half-motor forward path voltage command $\overline{V}_{Cn}^*$ may include only one of the negative virtual half-motor proportional voltage command $\overline{V}_{Kn}^*$ or the negative virtual half-motor integral voltage command $\overline{V}_{In}^*$.

At 514, the method 500 determines a positive virtual half-motor feedback path voltage command $\overline{V}_{Hp}^*$ by applying a third set of gain factors to the positive virtual half-motor current $\overline{I}_p$. For example, and with reference to FIG. 10A, the motor controller 70 may implement the feedback compensator 320 to calculate the positive virtual half-motor feedback path voltage command $\overline{V}_{Hp}^*$ by applying the third set of gain factors to the positive virtual half-motor current $\overline{I}_p$.

At 516, the method 500 determines a negative virtual half-motor feedback path voltage command by applying a fourth set of gain factors to the negative virtual half-motor current. For example, and with reference to FIG. 10B, the motor controller 70 may implement the feedback compensator 320 to calculate the negative virtual half-motor feedback path voltage command $\overline{V}_{Hn}^*$ by applying the fourth set of gain factors to the negative virtual half-motor current $\overline{I}_n$.

At 518, the method 500 determines a positive virtual half-motor final voltage command $\overline{V}_p^*$ based on the positive virtual half-motor forward path voltage command $\overline{V}_{Cp}^*$ and based on the positive virtual half-motor feedback path voltage command $\overline{V}_{Hp}^*$. For example, and with reference to FIG. 10A, the motor controller 70 may implement the addition module 314 to calculate the positive virtual half-motor final voltage command $\overline{V}_p^*$ as a sum of the positive virtual half-motor forward path voltage command $\overline{V}_{Cp}^*$ and the positive virtual half-motor feedback path voltage command $\overline{V}_{Hp}^*$.

At 520, the method 500 determines a negative virtual half-motor final voltage command $\overline{V}_n^*$ based on the negative virtual half-motor forward path voltage command $\overline{V}_{Cn}^*$ and based on the negative virtual half-motor feedback path voltage command $\overline{V}_{Hn}^*$. For example, and with reference to FIG. 10B, the motor controller 70 may implement the addition module 314 to calculate the negative virtual half-motor final voltage command $\overline{V}_n^*$ as a sum of the negative virtual half-motor forward path voltage command $\overline{V}_{Cn}^*$ and the negative virtual half-motor feedback path voltage command $\overline{V}_{Hn}^*$.

At 522, the method 500 determines a first final voltage command $\overline{V}_1^*$ and a second final voltage command $\overline{V}_2^*$ by applying a second mathematical transformation to the positive virtual half-motor final voltage command $\overline{V}_p^*$ and the negative virtual half-motor final voltage command $\overline{V}_n^*$. For example, the motor controller 70 may apply the second mathematical transformation, which may be similar or identical to the input transformation block 152 of block diagram 150 shown on FIG. 5 in order to determine the first final voltage command $\overline{V}_1^*$ and the second final voltage command $\overline{V}_2^*$ based on the positive virtual half-motor final voltage command $\overline{V}_p^*$ and the negative virtual half-motor final voltage command $\overline{V}_n^*$.

At 524, the method 500 commands, based on the first final voltage command $\overline{V}_1^*$, a first inverter to apply a first output voltage $\overline{V}_1$ to the first winding set 62a and thereby causing a first output current $\overline{I}_1$ to be generated in the first winding set 62a. For example, the motor controller 70 may generate and supply the first final voltage command $\overline{V}_1^*$ to the first power converter 66a, thereby commanding the first inverter of the first power converter 66a to apply the first output voltage $\overline{V}_1$ to the first winding set 62a, thereby causing the first output current $\overline{I}_1$ to be generated in the first winding set 62a.

At 526, the method 500 commands, based on the second final voltage command $\overline{V}_2^*$, a second inverter to apply a second output voltage $\overline{V}_2$ to the second winding set 62b and thereby causing a second output current $\overline{I}_2$ to be generated in the second winding set 62b. For example, the motor controller 70 may generate and supply the second final voltage command $\overline{V}_2^*$ to the second power converter 66b, thereby commanding the second inverter of the second power converter 66b to apply the second output voltage $\overline{V}_2$ to the second winding set 62b, thereby causing the second output current $\overline{I}_2$ to be generated in the second winding set 62b.

In some embodiments, the first output current $\overline{I}_1$ and the second output current $\overline{I}_2$ each have a d-axis component and a q-axis component, $I_{d1}$, $I_{q1}$, $I_{d2}$, $I_{q2}$, respectively, and at least one of the first set of gain factors, the second set of gain factors, the third set of gain factors or the fourth set of gain factors is configured to cause the d-axis component $I_{d1}$, and the q-axis component $I_{q1}$ of the first output current $\overline{I}_1$ to be decoupled from variations of the d-axis component $I_{d2}$ and the q-axis components $I_{q2}$ of the second output current $\overline{I}_2$. For example, one or more of the first through fourth sets of gain factors, or any combination of two or more of the first through fourth sets of gain factors may cause the d-axis component $I_{d1}$, and the q-axis component $I_{q1}$ of the first output current $\overline{I}_1$ to be decoupled from variations of d-axis component $I_{d2}$ and the q-axis components $I_{q2}$ of the second output current $\overline{I}_2$.

In some embodiments, the at least one of the first set of gain factors, the second set of gain factors, the third set of gain factors, or the fourth set of gain factors is further configured to cause the d-axis component $I_{d1}$ of the first output current $\overline{I}_1$ to be decoupled from variations of the q-axis component $I_{q1}$ of the first output current $\overline{I}_1$.

In some embodiments, calculating the positive virtual half-motor forward path voltage command $\overline{V}_{Cp}^*$ based on the positive half-motor difference current $\overline{I}_{Ep}$ at step 508 also includes applying at least a portion of the first set of gain factors directly to the positive half-motor difference current. For example, the motor controller 70 may implement the proportional compensation module 306 to calculate the proportional voltage command $\overline{V}_{Kp}^*$ from the difference current $\overline{I}_{Ep}$. The first set of gain factors may include one or more gain factors applied by the proportional compensation module 306 to calculate the proportional voltage command $\overline{V}_{Kp}^*$. The motor controller 70 may further determine the positive virtual half-motor forward path voltage command $\overline{V}_{Cp}^*$ based on the proportional voltage command $\overline{V}_{Kp}^*$ for example, the motor controller 70 may implement the addition module 312 to generate the positive virtual half-motor forward path voltage command $\overline{V}_{Cp}^*$ based on the positive virtual half-motor proportional voltage command $\overline{V}_{Kp}^*$.

In some embodiments, the method 500 integrates the positive half-motor difference current $\overline{I}_{Ep}$ to generate an integrated difference signal, and calculating the positive virtual half-motor forward path voltage command $\overline{V}_{Cp}^*$ based on the positive half-motor difference current $\overline{I}_{Ep}$ at step 508 also includes applying at least a portion of the first set of gain factors to the integrated difference signal. For example, the motor controller 70 may implement the integral compensation controller 308, 310 including the integration module 308 to generate the integrated difference signal. The motor controller 70 may also implement the integral gain module 310 to calculate the positive virtual half-motor integral voltage command $\overline{V}_{Ip}$ by applying at least a portion of the first set of gain factors to the integrated difference signal produced by the integration module 308 to produce a positive virtual half-motor integral voltage command $\overline{V}_{Ip}*$. In some embodiments, and as shown in FIG. 10A, calculating the positive virtual half-motor forward path voltage command $\overline{V}_{Cp}*$ may also include the motor controller 70 implementing the addition module 312 to produce the positive virtual half-motor forward path voltage command $\overline{V}_{Cp}*$ as the sum of the positive virtual half-motor proportional voltage command $\overline{V}_{Kp}*$ and the positive virtual half-motor integral voltage command $\overline{V}_{Ip}*$.

In some embodiments, at least one of the third set of gain factors or the fourth set of gain factors is configured to cause the d-axis component $I_{d1}$ and the q-axis component $I_{q1}$ of the first output current $\overline{I}_1$ to be decoupled from variations of d-axis component $I_{d2}$ and the q-axis component $I_{q2}$ of the second output current $\overline{I}_2$.

In some embodiments, both of the third set of gain factors and the fourth set of gain factors together cause the d-axis component $I_{d1}$ and the q-axis component $I_{q1}$ of the first output current $\overline{I}_1$ to be decoupled from variations of d-axis component $I_{d2}$ and the q-axis component $I_{q2}$ of the second output current $\overline{I}_2$. An example of such an arrangement is shown in the block diagram of FIGS. 10A-10B.

In some embodiments, at least one of the first set of gain factors or the second set of gain factors is configured to cause the d-axis component $I_{d1}$ and the q-axis component $I_{q1}$ of the first output current $\overline{I}_1$ to be decoupled from variations of d-axis component $I_{d2}$ and the q-axis component $I_{q2}$ of the second output current $\overline{I}_2$.

In some embodiments, both of the first set of gain factors and the second set of gain factors together cause the d-axis component $I_{d1}$ and the q-axis component $I_{q1}$ of the first output current $\overline{I}_1$ to be decoupled from variations of d-axis component $I_{d2}$ and the q-axis component $I_{q2}$ of the second output current $\overline{I}_2$. An example of such an arrangement is shown in the block diagram of FIGS. 11A-11B.

In some embodiments, the method 500 calculates a back electromotive force (BEMF) compensation voltage configured to compensate for dynamics of BEMF in least one of a positive virtual half-motor and a negative virtual half-motor virtual half-motor. In some embodiments, at least one of the positive virtual half-motor final voltage command $\overline{V}_p*$ and the negative virtual half-motor final voltage command $\overline{V}_n*$ is further based on the BEMF compensation voltage. For example, and with reference to FIG. 10A, the motor controller 70 may implement the BEMF compensation module 302 to calculate a BEMF compensation voltage $\overline{V}_{Fp}*$ based on an estimated BEMF of the positive virtual motor winding 172a and which compensates for the dynamics of the estimated BEMF voltage. The motor controller 70 may also implement the addition module 314 to calculate the positive virtual half-motor final voltage command $\overline{V}_p*$ as a sum of the positive virtual half-motor forward path voltage command $\overline{V}_{Cp}*$ and the positive virtual half-motor feedback path voltage command $\overline{V}_{Hp}*$ and the BEMF compensation voltage $\overline{V}_{Fp}*$.

In some embodiments, only one of the positive virtual half-motor final voltage command $\overline{V}_p*$ and the negative virtual half-motor final voltage command $\overline{V}_n*$ is further based on the BEMF compensation voltage $\overline{V}_{Fp}*$ or $\overline{V}_{Fn}*$. For example, and with reference to FIGS. 10A-10B, the BEMF compensation module 302 of the second current control module 282 of FIG. 10B includes a zero matrix, thus causing the negative virtual half-motor BEMF compensation voltage $\overline{V}_{Fn}*$ to have zero value. In other words, in some embodiments and as shown for example in FIGS. 10A-10B, only the positive virtual half-motor final voltage command $\overline{V}_p*$ is based on a virtual half-motor BEMF compensation voltage $\overline{V}_{Fp}*$, and the negative virtual half-motor final voltage command $\overline{V}_n*$ does not include any BEMF compensation.

In some embodiments, the first output current $\overline{I}_1$ and the second output current $\overline{I}_2$ may each have a d-axis component and a q-axis component, $I_{d1}$, $I_{q1}$, $I_{d2}$, $I_{q2}$, respectively, and at least one of the first set of gain factors or the second set of gain factors may be configured to cause the d-axis component $I_{d1}$ and the q-axis component $I_{q1}$ of the first output current $\overline{I}_1$ to be decoupled from variations of the d-axis component $I_{d2}$ and the q-axis components $I_{q2}$ of the second output current $\overline{I}_2$. For example, the first set of gain factors, the second set of gain factors, or a combination of the first and second sets of gain factors may cause the d-axis component $I_{d1}$, and the q-axis component $I_{q1}$ of the first output current $\overline{I}_1$ to be decoupled from variations of d-axis component $I_{d2}$ and the q-axis components $I_{q2}$ of the second output current $\overline{I}_2$.

In some embodiments, at least one of the first set of gain factors or the second set of gain factors is further configured to cause the d-axis component $I_{d1}$ of the first output current $\overline{I}_1$ to be decoupled from variations of the q-axis component $I_{q1}$ of the first output current $\overline{I}_1$. For example, the first set of gain factors, the second set of gain factors, or a combination of the first and second sets of gain factors may cause the d-axis component $I_{d1}$ of the first output current $\overline{I}_1$ to be decoupled from variations of the q-axis component $I_{q1}$ of the first output current $\overline{I}_1$.

In some embodiments, a system for controlling a dual wound synchronous machine (DWSM) having a first winding set and a second winding set includes a processor and a memory including instructions. When executed by the processor, the instructions cause the processor to: determine a positive virtual half-motor current command and a negative virtual half-motor current command based on a first motor current command associated with the first winding set and based on a second motor current command associated with the second winding set; determine a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM; determine a positive half-motor difference current based on a difference between the positive virtual half-motor current command and the positive virtual half-motor current; calculate a positive virtual half-motor forward path voltage command based on the positive half-motor difference current and using a first set of gain factors; determine a negative half-motor difference current based on a difference between the negative virtual half-motor current command and the negative virtual half-motor current; calculate a negative virtual half-motor forward path voltage command based on the negative half-motor difference current and using a second set of gain factors; determine a positive virtual half-motor feedback path voltage command by applying a third set of gain factors to the positive virtual half-motor current; determine a negative virtual half-motor feedback path voltage command by applying a fourth set of gain factors to the negative virtual half-motor current; determine a positive virtual half-motor final voltage command based on the positive virtual half-motor forward path voltage command and based on the positive virtual half-motor feedback path voltage command; determine a negative virtual half-motor final voltage command based on the negative virtual half-motor forward path voltage command and based on the negative virtual half-motor feedback path voltage command; determine a first final voltage command and a second final voltage command by applying a second mathematical transformation to the positive virtual half-motor final voltage command and the negative virtual half-motor final voltage command; command, based on the first final voltage command, a first inverter to apply a first output voltage to the first winding set and thereby causing a first output current to be generated in the first winding set; and command, based on the second final voltage command, a second inverter to apply a second output voltage to the second winding set and thereby causing a second output current to be generated in the second winding set. In some embodiments, the first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

In some embodiments, the at least one of the first set of gain factors, the second set of gain factors, the third set of gain factors, or the fourth set of gain factors is further configured to cause the d-axis component of the first output current to be decoupled from variations of the q-axis component of the first output current.

In some embodiments, calculating the positive virtual half-motor forward path voltage command based on the positive half-motor difference current includes applying at least a portion of the first set of gain factors directly to the positive half-motor difference current.

In some embodiments, the instructions further cause the processor to integrate the positive half-motor difference current to generate an integrated difference signal, and calculating the positive virtual half-motor forward path voltage command based on the positive half-motor difference current includes applying at least a portion of the first set of gain factors to the integrated difference signal.

In some embodiments, at least one of the third set of gain factors or the fourth set of gain factors is configured to cause the d-axis component and the q-axis component of the first output current to be decoupled from variations of d-axis and q-axis components of the second output current.

In some embodiments, both of the third set of gain factors and the fourth set of gain factors together cause the d-axis component and the q-axis component of the first output current to be decoupled from variations of d-axis and q-axis components of the second output current.

In some embodiments, at least one of the first set of gain factors or the second set of gain factors is configured to cause the d-axis component and the q-axis component of the first output current to be decoupled from variations of d-axis and q-axis components of the second output current.

In some embodiments, both of the first set of gain factors and the second set of gain factors together cause the d-axis component and the q-axis component of the first output current to be decoupled from variations of d-axis and q-axis components of the second output current.

In some embodiments, the instructions further cause the processor to compute a back electromotive force (BEMF) compensation voltage based on an estimated BEMF of the positive virtual half-motor, and at least one of the positive virtual half-motor final voltage command and the negative virtual half-motor final voltage command is further based on the BEMF compensation voltage.

In some embodiments, only one of the positive virtual half-motor final voltage command and the negative virtual half-motor final voltage command is further based on the BEMF compensation voltage.

In some embodiments, a method of controlling a dual wound synchronous machine (DWSM) having a first winding set and a second winding set, includes: determining a positive virtual half-motor current command and a negative virtual half-motor current command based on a first motor current command associated with the first winding set and based on a second motor current command associated with the second winding set; determining a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM; determining a positive half-motor difference current based on a difference between the positive virtual half-motor current command and the positive virtual half-motor current; calculating a positive virtual half-motor forward path voltage command based on the positive half-motor difference current and using a first set of gain factors; determining a negative half-motor difference current based on a difference between the negative virtual half-motor current command and the negative virtual half-motor current; calculating a negative virtual half-motor forward path voltage command based on the negative half-motor difference current and using a second set of gain factors; determining a positive virtual half-motor feedback path voltage command by applying a third set of gain factors to the positive virtual half-motor current; determining a negative virtual half-motor feedback path voltage command by applying a fourth set of gain factors to the negative virtual half-motor current; determining a positive virtual half-motor final voltage command based on the positive virtual half-motor forward path voltage command and based on the positive virtual half-motor feedback path voltage command; determining a negative virtual half-motor final voltage command based on the negative virtual half-motor forward path voltage command and based on the negative virtual half-motor feedback path voltage command; determining a first final voltage command and a second final voltage command by applying a second mathematical transformation to the positive virtual half-motor final voltage command and the negative virtual half-motor final voltage command; commanding, based on the first final voltage command, a first inverter to apply a first output voltage to the first winding set and thereby causing a first output current to be generated in the first winding set; and commanding, based on the second final voltage command, a second inverter to apply a second output voltage to the second winding set and thereby causing a second output current to be generated in the second winding set. In some embodiments, the first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

In some embodiments, the at least one of the first set of gain factors, the second set of gain factors, the third set of gain factors, or the fourth set of gain factors is further configured to cause the d-axis component of the first output current to be decoupled from variations of the q-axis component of the first output current.

In some embodiments, calculating the positive virtual half-motor forward path voltage command based on the positive half-motor difference current includes applying at least a portion of the first set of gain factors directly to the positive half-motor difference current.

In some embodiments, the method further includes: integrating the positive half-motor difference current to generate an integrated difference signal, and calculating the positive virtual half-motor forward path voltage command based on the positive half-motor difference current includes applying at least a portion of the first set of gain factors to the integrated difference signal.

In some embodiments, at least one of the third set of gain factors or the fourth set of gain factors is configured to cause the d-axis component and the q-axis component of the first output current to be decoupled from variations of d-axis and q-axis components of the second output current.

In some embodiments, both of the third set of gain factors and the fourth set of gain factors together cause the d-axis component and the q-axis component of the first output current to be decoupled from variations of d-axis and q-axis components of the second output current.

In some embodiments, at least one of the first set of gain factors or the second set of gain factors is configured to cause the d-axis component and the q-axis component of the first output current to be decoupled from variations of d-axis and q-axis components of the second output current.

In some embodiments, both of the first set of gain factors and the second set of gain factors together cause the d-axis component and the q-axis component of the first output current to be decoupled from variations of d-axis and q-axis components of the second output current.

In some embodiments, the method further includes calculating a back electromotive force (BEMF) compensation voltage configured to compensate for dynamics of BEMF in least one of a positive virtual half-motor and a negative virtual half-motor virtual half-motor, and at least one of the positive virtual half-motor final voltage command and the negative virtual half-motor final voltage command is further based on the BEMF compensation voltage.

In some embodiments, only one of the positive virtual half-motor final voltage command and the negative virtual half-motor final voltage command is further based on the BEMF compensation voltage.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended

Having thus described the invention, it is claimed:

1. A system for controlling a dual wound synchronous machine (DWSM) having a first winding set and a second winding set, the system comprising:
a processor and a memory including instructions that, when executed by the processor, cause the processor to:
determine a positive virtual half-motor current command and a negative virtual half-motor current command based on a first motor current command associated with the first winding set and based on a second motor current command associated with the second winding set;
determine a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM;
determine a positive half-motor difference current based on a difference between the positive virtual half-motor current command and the positive virtual half-motor current;
calculate a positive virtual half-motor forward path voltage command based on the positive half-motor difference current and using a first set of gain factors;
determine a negative half-motor difference current based on a difference between the negative virtual half-motor current command and the negative virtual half-motor current;
calculate a negative virtual half-motor forward path voltage command based on the negative half-motor difference current and using a second set of gain factors;
determine a positive virtual half-motor feedback path voltage command by applying a third set of gain factors to the positive virtual half-motor current;
determine a negative virtual half-motor feedback path voltage command by applying a fourth set of gain factors to the negative virtual half-motor current;
determine a positive virtual half-motor final voltage command based on the positive virtual half-motor forward path voltage command and based on the positive virtual half-motor feedback path voltage command;
determine a negative virtual half-motor final voltage command based on the negative virtual half-motor forward path voltage command and based on the negative virtual half-motor feedback path voltage command;
determine a first final voltage command and a second final voltage command by applying a second mathematical transformation to the positive virtual half-motor final voltage command and the negative virtual half-motor final voltage command;
command, based on the first final voltage command, a first inverter to apply a first output voltage to the first winding set and thereby causing a first output current to be generated in the first winding set; and
command, based on the second final voltage command, a second inverter to apply a second output voltage to the second winding set and thereby causing a second output current to be generated in the second winding set,
wherein the first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

2. The system of claim 1, wherein the at least one of the first set of gain factors, the second set of gain factors, the third set of gain factors, or the fourth set of gain factors is further configured to cause the d-axis component of the first output current to be decoupled from variations of the q-axis component of the first output current.

3. The system of claim 1, wherein calculating the positive virtual half-motor forward path voltage command based on the positive half-motor difference current includes applying at least a portion of the first set of gain factors directly to the positive half-motor difference current.

4. The system of claim 1, wherein the instructions further cause the processor to integrate the positive half-motor difference current to generate an integrated difference signal, and
wherein calculating the positive virtual half-motor forward path voltage command based on the positive half-motor difference current includes applying at least a portion of the first set of gain factors to the integrated difference signal.

5. The system of claim 1, wherein at least one of the third set of gain factors or the fourth set of gain factors is configured to cause the d-axis component and the q-axis component of the first output current to be decoupled from variations of d-axis and q-axis components of the second output current.

6. The system of claim 5, wherein both of the third set of gain factors and the fourth set of gain factors together cause the d-axis component and the q-axis component of the first output current to be decoupled from variations of d-axis and q-axis components of the second output current.

7. The system of claim 1, wherein at least one of the first set of gain factors or the second set of gain factors is configured to cause the d-axis component and the q-axis component of the first output current to be decoupled from variations of d-axis and q-axis components of the second output current.

8. The system of claim 7, wherein both of the first set of gain factors and the second set of gain factors together cause the d-axis component and the q-axis component of the first output current to be decoupled from variations of d-axis and q-axis components of the second output current.

9. The system of claim 1, wherein the instructions further cause the processor to compute a back electromotive force (BEMF) compensation voltage based on an estimated BEMF of the positive virtual half-motor, and
wherein at least one of the positive virtual half-motor final voltage command and the negative virtual half-motor final voltage command is further based on the BEMF compensation voltage.

10. The system of claim 9, wherein only one of the positive virtual half-motor final voltage command and the negative virtual half-motor final voltage command is further based on the BEMF compensation voltage.

11. A method of controlling a dual wound synchronous machine (DWSM) having a first winding set and a second winding set, the method comprising:
- determining a positive virtual half-motor current command and a negative virtual half-motor current command based on a first motor current command associated with the first winding set and based on a second motor current command associated with the second winding set;
- determining a positive virtual half-motor current and a negative virtual half-motor current by applying a first mathematical transformation on measured currents in each of the first winding set and the second winding set, the positive virtual half-motor current corresponding to a positive virtual motor winding associated with the DWSM, and the negative virtual half-motor current corresponding to a negative virtual motor winding associated with the DWSM;
- determining a positive half-motor difference current based on a difference between the positive virtual half-motor current command and the positive virtual half-motor current;
- calculating a positive virtual half-motor forward path voltage command based on the positive half-motor difference current and using a first set of gain factors;
- determining a negative half-motor difference current based on a difference between the negative virtual half-motor current command and the negative virtual half-motor current;
- calculating a negative virtual half-motor forward path voltage command based on the negative half-motor difference current and using a second set of gain factors;
- determining a positive virtual half-motor feedback path voltage command by applying a third set of gain factors to the positive virtual half-motor current;
- determining a negative virtual half-motor feedback path voltage command by applying a fourth set of gain factors to the negative virtual half-motor current;
- determining a positive virtual half-motor final voltage command based on the positive virtual half-motor forward path voltage command and based on the positive virtual half-motor feedback path voltage command;
- determining a negative virtual half-motor final voltage command based on the negative virtual half-motor forward path voltage command and based on the negative virtual half-motor feedback path voltage command;
- determining a first final voltage command and a second final voltage command by applying a second mathematical transformation to the positive virtual half-motor final voltage command and the negative virtual half-motor final voltage command;
- commanding, based on the first final voltage command, a first inverter to apply a first output voltage to the first winding set and thereby causing a first output current to be generated in the first winding set; and
- commanding, based on the second final voltage command, a second inverter to apply a second output voltage to the second winding set and thereby causing a second output current to be generated in the second winding set, wherein the first output current and the second output current each have a d-axis component and a q-axis component, and at least one of the first set of gain factors, the second set of gain factors, the third set of gain factors or the fourth set of gain factors is configured to cause the d-axis component and the q-axis component of the first output current to be decoupled from variations of d-axis and q-axis components of the second output current.

12. The method of claim 11, wherein the at least one of the first set of gain factors, the second set of gain factors, the third set of gain factors, or the fourth set of gain factors is further configured to cause the d-axis component of the first output current to be decoupled from variations of the q-axis component of the first output current.

13. The method of claim 11, wherein calculating the positive virtual half-motor forward path voltage command based on the positive half-motor difference current includes applying at least a portion of the first set of gain factors directly to the positive half-motor difference current.

14. The method of claim 11, further comprising integrating the positive half-motor difference current to generate an integrated difference signal, and
- wherein calculating the positive virtual half-motor forward path voltage command based on the positive half-motor difference current includes applying at least a portion of the first set of gain factors to the integrated difference signal.

15. The method of claim 11, wherein at least one of the third set of gain factors or the fourth set of gain factors is configured to cause the d-axis component and the q-axis component of the first output current to be decoupled from variations of d-axis and q-axis components of the second output current.

16. The method of claim 15 wherein both of the third set of gain factors and the fourth set of gain factors together cause the d-axis component and the q-axis component of the first output current to be decoupled from variations of d-axis and q-axis components of the second output current.

17. The method of claim 11, wherein at least one of the first set of gain factors or the second set of gain factors is configured to cause the d-axis component and the q-axis component of the first output current to be decoupled from variations of d-axis and q-axis components of the second output current.

18. The method of claim 17, wherein both of the first set of gain factors and the second set of gain factors together cause the d-axis component and the q-axis component of the first output current to be decoupled from variations of d-axis and q-axis components of the second output current.

19. The method of claim 11, further comprising calculating a back electromotive force (BEMF) compensation voltage configured to compensate for dynamics of BEMF in least one of a positive virtual half-motor and a negative virtual half-motor virtual half-motor, and
- wherein at least one of the positive virtual half-motor final voltage command and the negative virtual half-motor final voltage command is further based on the BEMF compensation voltage.

20. The method of claim 19, wherein only one of the positive virtual half-motor final voltage command and the negative virtual half-motor final voltage command is further based on the BEMF compensation voltage.

* * * * *